(12) United States Patent
Patel

(10) Patent No.: US 10,110,346 B1
(45) Date of Patent: Oct. 23, 2018

(54) METHOD AND APPARATUS FOR SOFT BIT COMPUTATION IN MIMO DECODERS

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 216 days.

(21) Appl. No.: 15/098,553

(22) Filed: Apr. 14, 2016

(51) Int. Cl.
*H04L 1/00* (2006.01)
*H04B 7/0413* (2017.01)
*H04W 72/04* (2009.01)

(52) U.S. Cl.
CPC ......... *H04L 1/0047* (2013.01); *H04B 7/0413* (2013.01); *H04W 72/042* (2013.01); *H04W 72/0413* (2013.01); *H04B 2201/709709* (2013.01)

(58) Field of Classification Search
None
See application file for complete search history.

(56) References Cited

U.S. PATENT DOCUMENTS

| | | | |
|---|---|---|---|
| 8,090,063 B2* | 1/2012 | Lee | H04B 7/0857 375/267 |
| 2007/0036245 A1* | 2/2007 | Hammerschmidt | H04B 1/406 375/340 |
| 2007/0036246 A1* | 2/2007 | Hammerschmidt | H04B 1/406 375/340 |
| 2007/0077969 A1* | 4/2007 | Lauer | H04L 1/0054 455/562.1 |
| 2007/0092020 A1* | 4/2007 | Seki | H04L 1/0069 375/267 |
| 2008/0310556 A1* | 12/2008 | Lee | H04L 25/067 375/340 |
| 2009/0116590 A1* | 5/2009 | Lee | H04B 7/0413 375/341 |
| 2009/0232232 A1* | 9/2009 | Duvaut | H04L 25/03184 375/260 |

(Continued)

OTHER PUBLICATIONS

Rogyaswami, Paulraj, et al. "Introduction to Space-Time Wirless Communications" (2003) Cambridge, pp. 49-157.

*Primary Examiner* — Edan Orgad
*Assistant Examiner* — Emmanuel Maglo
(74) *Attorney, Agent, or Firm* — Lerner, David, Littenberg, Krumholz & Mentlik, LLP

(57) ABSTRACT

Forward Error Correction (FEC) is an essential component of most digital communication systems. The decoders for the FEC perform better when working in soft-decision mode using the Log Likelihood Ratios (LLRs) as the input. Spatial Multiplexing (SM) with Multiple Input Multiple Output (MIMO) is used in many systems for providing high data rate. When SM-MIMO is used in conjunction with FEC, it is important for SM-MIMO decoders to provide soft channel bits to the FEC decoder. The complexity of the SM-MIMO decoders is generally very high, especially when LLRs need to be generated for each bit of the decoded symbol. Conventional methods for LLR generation in SM-MIMO decoders require the storage and sorting of partial and cumulative distance. A method and apparatus are disclosed that compute the LLRs on the fly without requiring extensive storage or sorting of partial and cumulative distance metrics.

13 Claims, 18 Drawing Sheets

(56) References Cited

U.S. PATENT DOCUMENTS

| | | | | |
|---|---|---|---|---|
| 2009/0252249 | A1* | 10/2009 | Kim | H04B 7/0417 375/267 |
| 2010/0017674 | A1* | 1/2010 | Mo | H04L 1/1816 714/749 |
| 2010/0177845 | A1* | 7/2010 | Murakami | H04B 7/0697 375/295 |
| 2010/0232549 | A1* | 9/2010 | Oizumi | H04L 25/0204 375/341 |
| 2010/0329378 | A1* | 12/2010 | Leung | H04B 7/0697 375/267 |
| 2010/0329393 | A1* | 12/2010 | Higuchi | H04B 7/0413 375/340 |
| 2012/0076227 | A1* | 3/2012 | Taoka | H04L 1/0016 375/267 |
| 2012/0106666 | A1* | 5/2012 | Eckert | H04L 25/03242 375/261 |
| 2013/0272448 | A1* | 10/2013 | Moon | H04B 7/0413 375/298 |
| 2014/0351667 | A1* | 11/2014 | Gadat | H03M 13/3753 714/752 |
| 2015/0063498 | A1* | 3/2015 | Jalloul | H04L 27/2649 375/340 |
| 2016/0142182 | A1* | 5/2016 | Scherb | H04L 1/0059 375/341 |
| 2017/0170991 | A1* | 6/2017 | Scholand | H04B 17/318 |

* cited by examiner

METHOD AND APPARATUS FOR SOFT BIT COMPUTATION IN MIMO DECODERS

BACKGROUND

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred to as the serving base station. In some wireless communication systems the serving base station is normally referred to as the serving cell. The terms base station and a cell may be used interchangeably herein. In general, the cells that are in the vicinity of the serving cell are called neighbor cells. Similarly, in some wireless communication systems a neighbor base station is normally referred to as a neighbor cell.

Multiple transmit and/or receive chains are commonly used in many wireless communication systems for different purposes. Multiple transmit and/or receive chains in wireless communication systems offer spatial dimension that can be exploited in the design of wireless communication systems. Communication systems with multiple transmit and/or receive chains offer improved performance. The performance improvement can be in terms of better coverage, higher data rates, reduced Signal to Noise Ratio (SNR) requirements, multiplexing of multiple users on the same channel at the same time, or some combination of the above. Different techniques using multiple receive and/or transmit chains are often referred to with different names such as diversity combining (maximum ratio combining, equal gain combining, selection combining, etc.), space-time coding (STC) or space-time block coding (STBC), spatial multiplexing (SM), beamforming and multiple input multiple output (MIMO). Wireless communication systems with multiple transmit chains at the transmit entity and multiple receive chains at the receive entity are generically referred to as MIMO systems. The aspects of the present disclosure may apply to Spatial Multiplexing MIMO systems, i.e., wireless communication systems that use the Spatial Multiplexing technique using multiple transmit chains at the transmit entity and multiple receive chains at the receive entity.

In Spatial Multiplexing, a high data rate stream is split into multiple lower data rate streams and all the lower data rate streams are transmitted simultaneously from all the available transmit antennas on the same frequency at the same time. Alternatively, data from two or more different users or applications may be transmitted simultaneously from all the available transmit antennas on the same frequency at the same time. If signals from different transmit antennas arrive at the receiver antennas through sufficiently different spatial propagation paths, the receiver may be able to separate these streams of data, creating parallel channels on the same frequency at the same time. SM is a powerful technique for increasing channel capacity at higher SNR. The maximum number of spatially multiplexed data streams is limited by the minimum of the number of antennas at the transmit entity and the number of antennas at the receive entity. For example, if the number of transmit antennas at the transmit entity is four and the number of receive antennas at the receive entity is two, the maximum number of spatially separable data streams is two.

FIG. 2 illustrates an example of an SM-MIMO wireless communication system with two transmit chains at the transmit entity, for example a base station, and two receive chains at the receive entity, for example a client terminal. The following notation is used in describing various signals in the remainder of the present document. A subscript to a signal name denotes transmit or receive chain number to which the signal is associated. When there are two subscripts to a signal name, the first subscript refers to the transmit chain and the second subscript refers to the receive chain to which the signal is associated. Let $N_t$ denote the number of transmit chains and $N_r$ denote the number of receive chains. For SM the number of parallel data streams that can be supported is equal to the minimum of the number of transmit antennas $N_t$ and the number of receive antennas $N_r$. Normally a wireless communication system with $N_t$ transmit chains at the transmit entity and $N_r$ receive chains at the receive entity is referred as $N_t \times N_r$ MIMO communication system.

In FIG. 2, the payload data from a user or an application are input to the Forward Error Correction (FEC) Encoder 202 at the transmit entity. The FEC encoded data are input to the SM-MIMO Encoder 204. The output of the SM-MIMO Encoder is transmitted over the two available antennas. The signal from a transmit antenna arrives at the two receive antennas through different propagation paths as shown in FIG. 2. The received signal at each receive antenna may be a combination of signals transmitted from the two transmit antennas and the noise as shown in FIG. 2. The signals received from the two receive antennas are processed by the SM-MIMO Decoder 206. Its output may be generally Log-Likelihood Ratio (LLR) for each bit. The LLR are input to the FEC Decoder which performs the error correction and detection and outputs the decoded data to the user or application.

In digital communication systems, the LLR for a received channel bit represents the reliability of the received demodulated channel bit. The reliability is generally a function of the prevailing channel conditions such as fading, Doppler, SNR, interference from other transmissions, the structure of the modulated data, and the type of receiver, for example, the type of SM-Decoder. The reliability of a received channel bit is expressed mathematically as a ratio of the probability of the received channel bit being 0 over the probability of it being 1. Often a logarithm (which is a monotonic function) of the probabilities is used for practical implementation considerations and therefore it is referred as Log-Likelihood Ratio (LLR). An LLR is often referred to as "soft bits" or "soft bit value." In contrast, when the received channel bits have only one of the two values, i.e., 0 or 1, the received channel bits are referred to as hard channel bits or simply hard bits.

Let an M-ary Quadrature Amplitude Modulation (QAM) symbol a be mapped to a bit-sequence through some mapping function $f$ as follows:

$$a = f(b_0, b_1, \ldots, b_{K-1})$$

where $M=2^K$ and $b_k$, $k=1, 2, \ldots, K$, are the bits being mapped to the QAM symbol a from the M-QAM constellation. The M-QAM constellation consists of a set of M complex points denoted by:

$$A = \{a_0, a_1, \ldots, a_{M-1}\}$$

Define a subset $A_k^+$ consisting of all the constellation points that have $k^{th}$ bit of the bit-sequence mapped to the constellation point set to zero (indicated by superscript +). Similarly define a subset $A_k^-$ of all the constellation points that have the $k^{th}$ bit of the codeword mapped to the constellation point set to one (indicated by superscript -). Mathematically, $$A_k^{\pm} = \{a \in A | b_k = \{0, 1\}\}$$

For example, the set of all the points in a 16-QAM constellation is shown in FIG. 3 with M=16 and K=4. The partitioning of this set into two subsets for the bit $b_0$ and $b_1$ being equal to 0 and being equal to 1 is as shown in FIG. 4. Using this notation, an LLR is expressed as follows for the received complex valued symbol r with:

$$LLR(b_k) = \log\left(\frac{Pr(b_k = 0 | r)}{Pr(b_k = 1 | r)}\right) \quad (1)$$

For the case of Gaussian noise n with mean m=0 and variance $\sigma^2$, its Probability Density Function (PDF) is expressed as follows:

$$P(n) = \frac{1}{\sqrt{2\pi\sigma^2}} e^{-\frac{(n-m)^2}{2\sigma^2}} \quad (2)$$

With the noise PDF as specified in EQ. (2), the LLR in EQ. (1) can be expressed as follows:

$$LLR(b_k) = \log\left\{\frac{\sum_{a \in A_k^+} e^{-\frac{|r-a|^2}{\sigma^2}}}{\sum_{a \in A_k^-} e^{-\frac{|r-a|^2}{\sigma^2}}}\right\} \quad (3)$$

In EQ. (3), a is one of the symbols from the used modulation constellation set, $A_k$ is the set of all possible symbols in a constellation.

The expression in EQ. (3) requires computation of log, exponentials, and distances from all the constellation points of the modulation used. Therefore, the ideal LLR expression in EQ. (3) may often be too complex for practical implementation. A commonly used approximation for LLR is as follows:

$$LLR(b_k) \cong -\frac{1}{\sigma^2}\left\{\min_{a \in A_k^+} |r-a|^2 - \min_{a \in A_k^-} |r-a|^2\right\} \quad (4)$$

EQ. (4) computes the difference of the distance metric for the nearest symbol with the bit $b_k=0$ and the distance metric for the nearest symbol with the bit $b_k=1$.

SM with MIMO is widely used for providing high data rate over a given channel bandwidth. In conventional non-SM transmissions schemes, usually a single symbol from a modulation constellation set may be transmitted per transmission interval. In case of SM, multiple symbols from a modulation constellation set corresponding to each parallel stream of SM may be transmitted per transmission interval. The sequence of modulation symbols used for simultaneous transmission in a single transmission interval is referred herein as symbol vector.

The complexity of the decoders for SM-MIMO may be generally very high since a linear system of equations may need to be solved at a very high speed. A straightforward implementation of Maximum Likelihood (ML) soft-output exact a-posteriori probability (APP) detection providing optimum error-rate performance requires extensive computation and comparison of the distances between received vector and all possible transmit symbol vectors, which may result in prohibitive complexity even for moderate data rates.

One of the commonly used techniques to reduce the complexity may be to convert the linear system of equations into a triangular linear system of equations using matrix algebra methods such as QR decomposition. The triangular linear system of equations may then be solved using one of the tree search methods such as Sphere decoding, M-Algorithm. A description of these methods may be found in "Introduction to Space-Time Wireless Communications" by A. Paulraj, et al., Cambridge University Press, 2003, pp. 149-157, incorporated by reference herein.

FEC is an essential component of most digital communication systems for reliable communication. The decoders for the FEC perform better when working in soft-decision mode using the LLRs as the input. At the receiver, typically an SM-MIMO decoder is followed by an FEC decoder as shown in FIG. 2. For a higher performance receiver, it is essential that the SM-MIMO decoder outputs LLRs which may be used as an input to the FEC decoder.

The set of symbols transmitted at the output of the SM-MIMO encoder is referred to as symbol vector. In FIG. 2, the symbol vector consists of symbols $s_0$ and $s_1$. Each symbol in a symbol vector belongs to a point in the modulation constellation being used for the SM-MIMO system. For example, the communication system may use Quadrature Phase Shift Keying (QPSK), 16-QAM, or 64-QAM as shown in FIG. 5. Each point in the constellation is associated with a 2, 4, and 6-bit codeword for QPSK, 16-QAM, and 64-QAM constellations respectively as shown in FIG. 5. The SM-MIMO decoders typically search for the symbol vector that is closest to the received symbol vector in terms of a metric which is usually some form of Euclidean distance. Each symbol in a symbol vector corresponds to the individual bit streams that are used to map the modulation symbols in the chosen constellation. When the search is completed, the SM-MIMO decoder has achieved the required hard output decoding for the symbol vector.

When the SM-MIMO decoder has achieved the required hard output decoding for the symbol vector, the corresponding codeword for each symbol, as shown in FIG. 5, provides the hard channel bits.

To compute the LLR for each of the bits in a codeword associated with each of the symbols in the decoded symbol vector, the SM-MIMO decoder may also search for the counter-hypothesis for each bit value of the codeword for each of the symbol. For example, in a 2×2 SM-MIMO system using 64-QAM modulation, for each of the two multiplexed data streams, there are six bits associated with each of the modulation symbols. For each 2×2 SM-MIMO symbol vector decoded, there are two 64-QAM symbols received and therefore a total 12 bits received. The soft bits need to be generated for each of the 12 bits.

Let the number of bits associated with each symbol vector be denoted by $b_0, b_1, \ldots, b_{N-1}$ where N is equal to 4, 8, or 12 for 2×2 SM-MIMO depending on whether the modulation type is QPSK, 16-QAM, or 64-QAM respectively. The computation of the LLR for each of the bits $b_k$ requires the distance metric for the symbol vector that is closest to the received symbol vector that has the corresponding bit value opposite of the bit value for the symbol vector that is closest to the received symbol vector. Specifically, if the decoded hard bit $b_0=0$ for the symbol vector that is closest to the received symbol vector, the soft bit generation requires the knowledge of the symbol vector that is closest to the received symbol vector but has the value of $b_1=1$. Similarly, if the decoded hard bit $b_0=1$ for the symbol vector that is closest to the received symbol vector, the soft bit generation requires the knowledge of the symbol vector that is closest to the received symbol vector but has the value of $b_0=0$. This search for the counter-hypothesis may be performed for each of the bits for the decoded symbol vector. Therefore, the SM-MIMO decoder may search for one optimal hypothesis (symbol vector closest to the received symbol vector) and search for up to N=12 counter-hypotheses. The search for counter-hypotheses requires the distance computation and sorting of the computed distances to find the minimum distance.

The tree search methods for SM-MIMO decoding reduce complexity by avoiding distance metric computations for symbol vectors that are not likely to lead to the correct hypothesis. While these distance metrics may not be required for reaching the correct hypothesis, they may be required for the counter-hypothesis to enable LLR computation. Generally, it is not known a priori which symbol vector is going to be the correct hypothesis and which ones are going to be required for counter-hypothesis. Therefore, only after the correct hypothesis is reached, the search for counter-hypothesis may be performed. This may lead to a scenario where the required metrics for LLR computation are not available when using tree search based methods to reduce complexity in SM-MIMO decoders.

SUMMARY

A method and apparatus are disclosed that compute the LLRs on the fly without requiring extensive storage or sorting of partial and cumulative distance metrics.

In accordance with an aspect of the disclosure, a method may include decoding first and second signals received at a same antenna in a multiple input multiple output (MIMO) communication system, wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0, b_1, \ldots, b_{K1-1}$, and wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0, b_1, \ldots, b_{K2-1}$. The method may include controlling, by a processing device, a first stage of distance computations, in which the first stage of distance computations includes: (I) performing first minimum distance computations for first symbols $S_a$, $S_b$, $S_c$, and $S_d$ corresponding to respective first constellation points of the first constellation, wherein the first minimum distance computations include: generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$, in which: a minimum of (i) a minimum of the distance metrics $DS_a$ and $DS_b$ and (ii) a stored minimum distance value for the bit $b_0=0$, is determined and stored as the stored minimum distance value for the bit $b_0=0$, a minimum of (i) a minimum of the distance metrics $DS_c$ and $DS_d$ and (ii) a stored minimum distance value for the bit $b_0=1$, is determined and stored as the stored minimum distance value for the bit $b_0=1$, a minimum of (i) a minimum of the distance metrics $DS_a$ and $DS_d$ and (ii) a stored minimum distance value for the bit $b_1=0$, is determined and stored as the stored minimum distance value for the bit $b_1=0$, a minimum of (i) a minimum of the distance metrics $DS_b$ and $DS_c$ and (ii) a stored minimum distance value for the bit $b_1=1$, is determined and stored as the stored minimum distance value for the bit $b_1=1$, a minimum of (i) a minimum of the distance metrics $DS_a$, $DS_b$, $DS_c$ and $DS_d$ and (ii) a stored minimum distance value for the bit $b_2=0$, is determined and stored as the stored minimum distance value for the bit $b_2=0$, and a minimum of (i) the minimum of the distance metrics $DS_a$, $DS_b$, $DS_c$ and $DS_d$ and (ii) a stored minimum distance value for the bit $b_3=0$, is determined stored as the stored minimum distance value for the bit $b_3=0$; and (II) performing second minimum distance computations for second symbols $S_e$, $S_f$, $S_g$, and $S_h$ corresponding to respective first constellation points of the first constellation, wherein the second minimum distance computations include: generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which: a minimum of (i) a minimum of the distance metrics $DS_e$ and $DS_f$ and (ii) the stored minimum distance value for the bit $b_0=0$, is determined and stored as the stored minimum distance value for the bit $b_0=0$, a minimum of (i) a minimum of the distance metrics $DS_g$ and $DS_h$ and (ii) the stored minimum distance value for the bit $b_0=1$, is determined and stored as the stored minimum distance value for the bit $b_0=1$, a minimum of (i) a minimum of the distance metrics $DS_e$ and $DS_h$ and (ii) the stored minimum distance value for the bit $b_1=0$, is determined and stored as the stored minimum distance value for the bit $b_1=0$, a minimum of (i) a minimum of the distance metrics $DS_f$ and $DS_g$ and (ii) the stored minimum distance value for the bit $b_1=1$, is determined and stored as the stored minimum distance value for the bit $b_1=1$, a minimum of (i) a minimum of the distance metrics $DS_e$, $DS_f$, $DS_g$ and $DS_h$ and (ii) a stored minimum distance value for the bit $b_2=1$, is determined and stored as the stored minimum distance value for the bit $b_2=1$, and a minimum of (i) the minimum of the distance metrics $DS_e$, $DS_f$, $DS_g$ and $DS_h$ and (ii) a stored minimum distance value for the bit $b_3=1$, is determined and stored as the stored minimum distance value for the bit $b_3=1$.

In one alternative, the first symbols maybe selected such that minimum distance values respectively corresponding to the K1 bits of a codeword for a given symbol corresponding to a given first constellation point of the first constellation can be generated without using each of stored minimum distance values respectively corresponding to the K1 bits of the codeword.

In one alternative, for each of the bits b, the stored minimum distance value for a given bit b being each of equal to one and zero may be initialized to a maximum value according to a bit-width of a register in which the stored minimum distance value is stored.

In one alternative, the first and second symbols may be selected such that, after minimum distance computations are performed to generate minimum distance values corresponding to the K1 bits for all symbols represented in the first constellation remaining unprocessed after the first and second minimum distance computations are performed, the stored minimum distance value for each of the bits b being equal to zero and one may be other than an original initialized value.

In one alternative, the minimum distances values may be generated for a given selected set of four symbols of the remaining unprocessed symbols by performing the first or second minimum distance computations, according to whether representation of the four symbols of the given selected set in the first constellation corresponds to the representation of the first symbols or the second symbols in the first constellation.

In one alternative, the first minimum distance computations for the first symbols may be performed without generating the minimum distance values for the bit $b_2=1$ and the bit $b_3=1$, and the second minimum distance computations for the second symbols may be performed without generating the minimum distance values for the bit $b_2=0$ and the bit $b_3=0$.

In one alternative, when K1 is greater than four, (i) the performing the first minimum distance computations for the first symbols $S_a$, $S_b$, $S_c$ and $S_d$ may include generating minimum distance values for each bit $b_{i=4 \ to \ K1-1}$ equal to zero, in which a minimum of (a) the minimum of the distance metrics $DS_a$, $DS_b$, $DS_c$ and $DS_d$ and (b) a stored minimum distance value for the bit $b_i=0$, is determined and stored as the stored minimum distance value for the bit $b_i=0$; and (ii) the performing the second minimum distance computations for the second symbols $S_e$, $S_f$, $S_g$ and $S_h$ may include generating minimum distance values for each bit $b_{i=4 \ to \ K1-1}$ equal to one, in which a minimum of (a) the minimum of the distance metrics $DS_e$, $DS_f$, $DS_g$ and $DS_h$ and (b) a stored minimum distance value for the bit $b_i=1$, is determined and stored as the stored minimum distance value for the bit $b_i=1$.

In one alternative, the method may include controlling, by the processing device, performing a second stage of distance computations including: for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations.

In one alternative, the method may include controlling, by the processing device, after the first and second stages of distance computations are performed, determining, for each bit b, a Log-Likelihood Ratio (LLR) by subtracting the minimum distance value for the bit b being equal to 1 from the minimum distance value for the bit b being equal to 0.

In one alternative, the method may include controlling, by the processing device, performing a second stage of distance computations including: for each of L of the symbols-M/1, wherein L is less than M1, generating, using all of the symbols-M/2 represented in the second constellation, a minimum distance value respectively corresponding to the bits $b_0$, $b_1$, ... $b_{K2-1}$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations.

In one alternative, the method may include controlling, by the processing device, after the first and second stages of distance computations are performed, determining, for each bit b, a Log-Likelihood Ratio (LLR) by subtracting the minimum distance value for the bit being equal to 1 from the minimum distance value for the bit being equal to 0.

In accordance with an aspect of the disclosure, an apparatus may decode first and second signals received at a same antenna in a multiple input multiple output (MIMO) communication system, wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0$, $b_1$, ... , $b_{K1-1}$, and wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0$, $b_1$, ... , $b_{K2-1}$. The apparatus may include circuitry configured to control a first stage of distance computations, in which the first stage of distance computations includes: (I) performing first minimum distance computations for first symbols $S_a$, $S_b$, $S_c$, and $S_d$ corresponding to respective first constellation points of the first constellation, wherein the first minimum distance computations include: generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$, in which: a minimum of (i) a minimum of the distance metrics $DS_a$ and $DS_b$ and (ii) a stored minimum distance value for the bit $b_0=0$, is determined and stored as the stored minimum distance value for the bit $b_0=0$, a minimum of (i) a minimum of the distance metrics $DS_c$ and $DS_d$ and (ii) a stored minimum distance value for the bit $b_0=1$, is determined and stored as the stored minimum distance value for the bit $b_0=1$, a minimum of (i) a minimum of the distance metrics $DS_a$ and $DS_d$ and (ii) a stored minimum distance value for the bit $b_1=0$, is determined and stored as the stored minimum distance value for the bit $b_1=0$, a minimum of (i) a minimum of the distance metrics $DS_b$ and $DS_c$ and (ii) a stored minimum distance value for the bit $b_1=1$, is determined and stored as the stored minimum distance value for the bit $b_1=1$, a minimum of (i) a minimum of the distance metrics $DS_a$, $DS_b$, $DS_c$ and $DS_d$ and (ii) a stored minimum distance value for the bit $b_2=0$, is determined and stored as the stored minimum distance value for the bit $b_2=0$, and a minimum of (i) the minimum of the distance metrics $DS_a$, $DS_b$, $DS_c$ and $DS_d$ and (ii) a stored minimum distance value for the bit $b_3=0$, is determined stored as the stored minimum distance value for the bit $b_3=0$; and (II) performing second minimum distance computations for second symbols $S_e$, $S_f$, $S_g$, and $S_h$ corresponding to respective first constellation points of the first constellation, wherein the second minimum distance computations include: generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which: a minimum of (i) a minimum of the distance metrics $DS_e$ and $DS_f$ and (ii) the stored minimum distance value for the bit $b_0=0$, is determined and stored as the stored minimum distance value for the bit $b_0=0$, a minimum of (i) a minimum of the distance metrics $DS_g$ and $DS_h$ and (ii) the stored minimum distance value for the bit $b_0=1$, is determined and stored as the stored minimum distance value for the bit $b_0=1$, a minimum of (i) a minimum of the distance metrics $DS_e$ and $DS_h$ and (ii) the stored minimum distance value for the bit $b_1=0$, is determined and stored as the stored minimum distance value for the bit $b_1=0$, a minimum of (i) a minimum of the distance metrics $DS_f$ and $DS_g$ and (ii) the stored minimum distance value for the bit $b_1=1$, is determined and stored as the stored minimum distance value for the bit $b_1=1$, a minimum of (i) a minimum of the distance metrics $DS_e$, $DS_f$, $DS_g$ and $DS_h$ and (ii) a stored minimum distance value for the bit $b_2=1$, is determined and stored as the stored minimum distance value for the bit $b_2=1$, and a minimum of (i) the minimum of the distance metrics $DS_e$, $DS_f$, $DS_g$ and $DS_h$ and (ii) a stored minimum distance value for the bit $b_3=1$, is determined and stored as the stored minimum distance value for the bit $b_3=1$.

In one alternative of the apparatus, the first symbols may be selected such that minimum distance values respectively corresponding to the K1 bits of a codeword for a given symbol corresponding to a given first constellation point of the first constellation can be generated without using each of stored minimum distance values respectively corresponding to the K1 bits of the codeword.

In one alternative of the apparatus, the first and second symbols may be selected such that, after minimum distance computations are performed to generate minimum distance values corresponding to the K1 bits for all symbols represented in the first constellation remaining unprocessed after the first and second minimum distance computations are performed, the stored minimum distance value for each of the bits b being equal to zero and one is other than an original initialized value.

In one alternative of the apparatus, the minimum distances values may be generated for a given selected set of four symbols of the remaining unprocessed symbols by performing the first or second minimum distance computations, according to whether representation of the four symbols of the given selected set in the first constellation corresponds to the representation of the first symbols or the second symbols in the first constellation.

In one alternative of the apparatus, when K1 is greater than four, (i) the performing the first minimum distance computations for the first symbols $S_a$, $S_b$, $S_c$ and $S_d$ may include generating minimum distance values for each bit $b_{i=4 \ to \ K1-1}$ equal to zero, in which a minimum of (a) the minimum of the distance metrics $DS_a$, $DS_b$, $DS_c$ and $DS_d$ and (b) a stored minimum distance value for the bit $b_i=0$, is determined and stored as the stored minimum distance value for the bit $b_i=0$; and (ii) the performing the second minimum distance computations for the second symbols $S_e$, $S_f$, $S_g$ and $S_h$ may include generating minimum distance values for each bit $b_{i=4 \ to \ K1-1}$ equal to one, in which a minimum of (a) the minimum of the distance metrics $DS_e$, $DS_f$, $DS_g$ and $DS_h$ and (b) a stored minimum distance value for the bit $b_i=1$, is determined and stored as the stored minimum distance value for the bit $b_i=1$.

In one alternative of the apparatus, the circuitry may be configured to control performing a second stage of distance computations including: for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations.

In one alternative of the apparatus, the circuitry may be configured to control, after the first and second stages of distance computations are performed, determining, for each bit b, a Log-Likelihood Ratio (LLR) by subtracting the minimum distance value for the bit b being equal to 1 from the minimum distance value for the bit b being equal to 0.

In one alternative of the apparatus, the circuitry may be configured to control performing a second stage of distance computations including: for each of L of the symbols-M/1, wherein L is less than M1, generating, using all of the symbols-M/2 represented in the second constellation, a minimum distance value respectively corresponding to the bits $b_0$, $b_1$, ... $b_{K2-1}$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols- M/2, the minimum distance value corresponding to the given bit equal to one or zero determined in the first stage of distance computations is stored as the minimum distance value of the given bit equal to one or zero as determined by the second stage of distance computations.

In accordance with an aspect of the disclosure, a wireless communication device may include a receiver to receive a signal in a multiple input multiple output (MIMO) communication system; and a processing device configured to control decoding first and second signals received at a same antenna of the wireless communication device, wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0, b_1, \ldots, b_{K1-1}$, and wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0, b_1, \ldots, b_{K2-1}$. The processing device may be configured to control a first stage of distance computations, in which the first stage of distance computations includes: (I) performing first minimum distance computations for first symbols $S_a$, $S_b$, $S_c$, and $S_d$ corresponding to respective first constellation points of the first constellation, wherein the first minimum distance computations include: generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$, in which: a minimum of (i) a minimum of the distance metrics $DS_a$ and $DS_b$ and (ii) a stored minimum distance value for the bit $b_0=0$, is determined and stored as the stored minimum distance value for the bit $b_0=0$, a minimum of (i) a minimum of the distance metrics $DS_c$ and $DS_d$ and (ii) a stored minimum distance value for the bit $b_0=1$, is determined and stored as the stored minimum distance value for the bit $b_0=1$, a minimum of (i) a minimum of the distance metrics $DS_a$ and $DS_d$ and (ii) a stored minimum distance value for the bit $b_1=0$, is determined and stored as the stored minimum distance value for the bit $b_1=0$, a minimum of (i) a minimum of the distance metrics $DS_b$ and $DS_c$ and (ii) a stored minimum distance value for the bit $b_1=1$, is determined and stored as the stored minimum distance value for the bit $b_1=1$, a minimum of (i) a minimum of the distance metrics $DS_a$, $DS_b$, $DS_c$ and $DS_d$ and (ii) a stored minimum distance value for the bit $b_2=0$, is determined and stored as the stored minimum distance value for the bit $b_2=0$, and a minimum of (i) the minimum of the distance metrics $DS_a$, $DS_b$, $DS_c$ and $DS_d$ and (ii) a stored minimum distance value for the bit $b_3=0$, is determined stored as the stored minimum distance value for the bit $b_3=0$; and (II) performing second minimum distance computations for second symbols $S_e$, $S_f$, $S_g$, and $S_h$ corresponding to respective first constellation points of the first constellation, wherein the second minimum distance computations include: generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which: a minimum of (i) a minimum of the distance metrics $DS_e$ and $DS_f$ and (ii) the stored minimum distance value for the bit $b_0=0$, is determined and stored as the stored minimum distance value for the bit $b_0=0$, a minimum of (i) a minimum of the distance metrics $DS_g$ and $DS_h$ and (ii) the stored minimum distance value for the bit $b_0=1$, is determined and stored as the stored minimum distance value for the bit $b_0=1$, a minimum of (i) a minimum of the distance metrics $DS_e$ and $DS_h$ and (ii) the stored minimum distance value for the bit $b_1=0$, is determined and stored as the stored minimum distance value for the bit $b_1=0$, a minimum of (i) a minimum of the distance metrics $DS_f$ and $DS_g$ and (ii) the stored minimum distance value for the bit $b_1=1$, is determined and stored as the stored minimum distance value for the bit $b_1=1$, a minimum of (i) a minimum of the distance metrics $DS_e$, $DS_f$, $DS_g$ and $DS_h$ and (ii) a stored minimum distance value for the bit $b_2=1$, is determined and stored as the stored minimum distance value for the bit $b_2=1$, and a minimum of (i) the minimum of the distance metrics $DS_e$, $DS_f$, $DS_g$ and $DS_h$ and (ii) a stored minimum distance value for the bit $b_3=1$, is determined and stored as the stored minimum distance value for the bit $b_3=1$.

In one alternative of the wireless communication device, the processing device may be configured to control performing a second stage of distance computations including: for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations.

DETAILED DESCRIPTION

Figure 1:
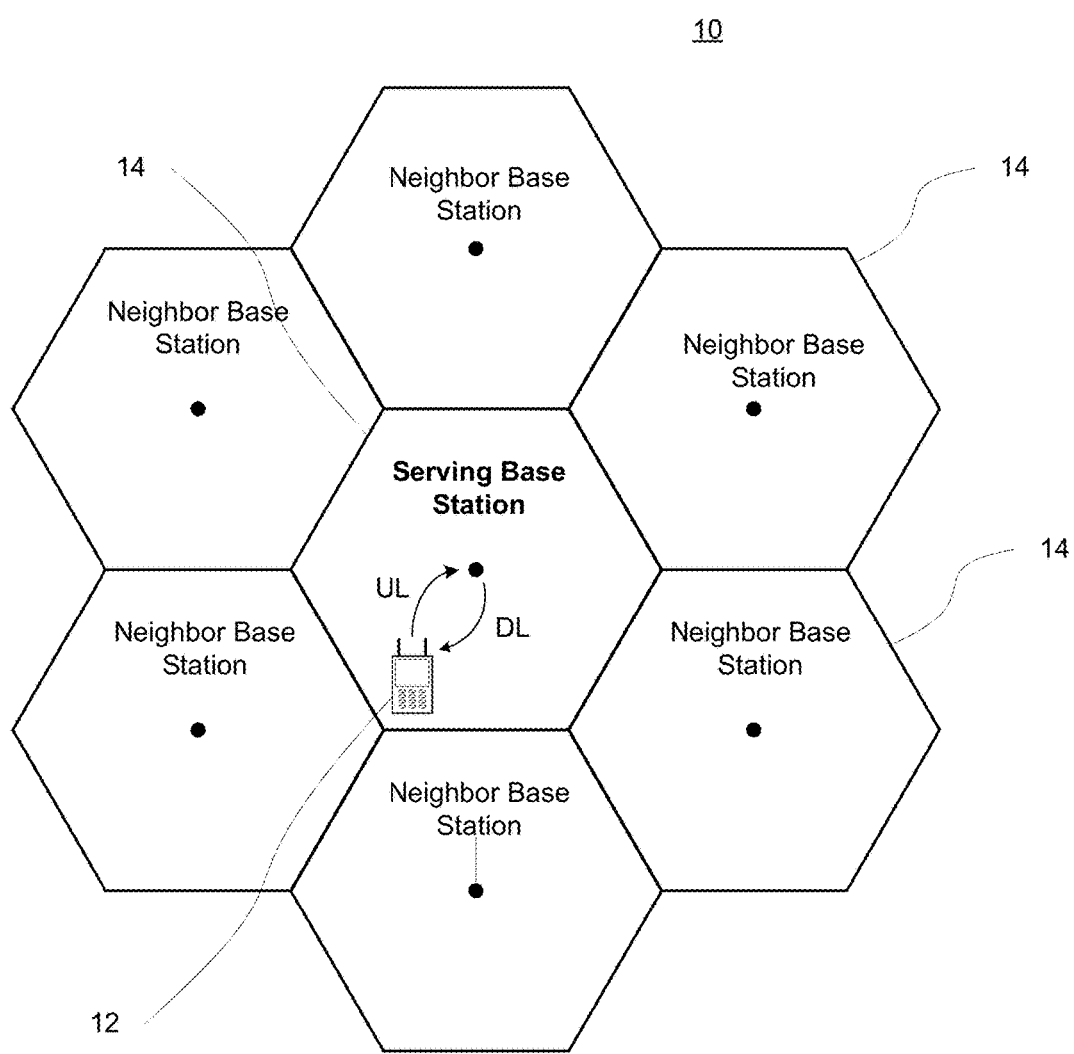
FIG. 1 illustrates a conventional mobile wireless communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the aspects of the disclosure are not intended to be limited to the specific terms used.

The tree search methods perform the decoding of the symbol vector one symbol at a time in successive stages. The partial distance metrics computed at each stage are used in subsequent stages for computing cumulative distance metrics. For each stage of the processing, multiple distance metrics may be computed at any given instance of time for high throughput. A method and apparatus are disclosed that explores multiple hypotheses and multiple counter-hypotheses in parallel as the distance metric for each of the candidate symbol vectors is computed at each stage. Without loss of generality, the method is illustrated first for the case of 16-QAM and 2×2 SM-MIMO system.

To illustrate the aspects of the disclosure, the received signal at the receiver in FIG. 2 may be expressed in matrix form as follows:

$$\begin{bmatrix} x_0 \\ x_1 \end{bmatrix} = \begin{bmatrix} h_{0,0} & h_{0,1} \\ h_{1,0} & h_{1,1} \end{bmatrix} \begin{bmatrix} s_0 \\ s_1 \end{bmatrix} + \begin{bmatrix} n_0 \\ n_1 \end{bmatrix} \quad (5)$$

Figure 2:
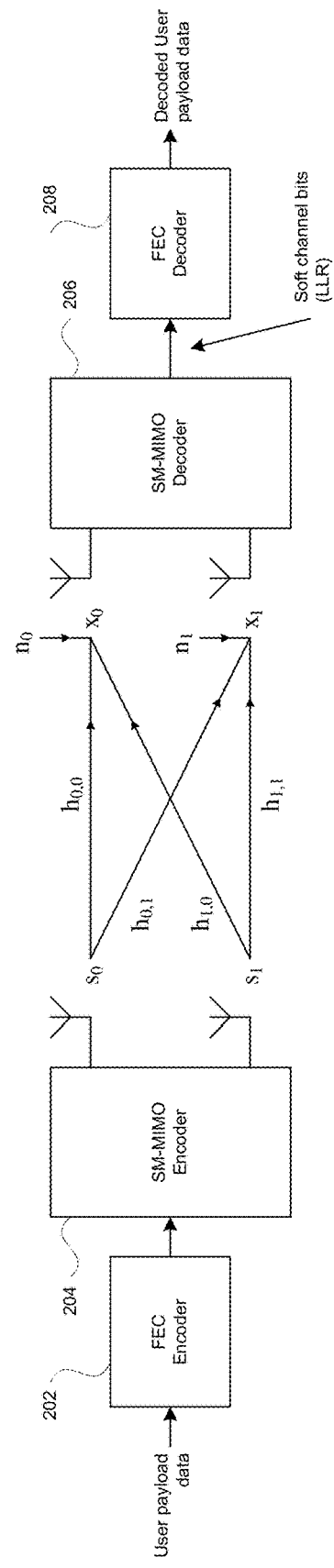
FIG. 2 illustrates an example SM-MIMO wireless communication system with two transmit chains at the transmit entity and two receive chains at the receive entity, which may be employed with aspects of the disclosure described herein.

As illustrated in FIG. 2, $s_0$ and $s_1$ are the transmitted SM-MIMO encoded signals, $h_{i,j}$ are the channel responses for the four propagation paths where $i=\{0,1\}$ and $j=\{0,1\}$ correspond to antenna indices, $x_0$ and $x_1$ are the received SM-MIMO encoded signals at the receiver, and $n_0$ and $n_1$ are the additive white Gaussian noise signals for each of the two receive antennas respectively.

After applying QR decomposition to EQ. (5), the following equivalent system of equations, suitable for tree search methods, is obtained:

$$\begin{bmatrix} y_0 \\ y_1 \end{bmatrix} = \begin{bmatrix} r_{0,0} & r_{0,1} \\ 0 & r_{1,1} \end{bmatrix} \begin{bmatrix} s_0 \\ s_1 \end{bmatrix} + \begin{bmatrix} w_0 \\ w_1 \end{bmatrix} \quad (6)$$

where $$y = \begin{bmatrix} y_0 \\ y_1 \end{bmatrix}, R = \begin{bmatrix} r_{0,0} & r_{0,1} \\ 0 & r_{1,1} \end{bmatrix},$$

and $w = \begin{bmatrix} w_0 \\ w_1 \end{bmatrix}$ are transformed versions of $\begin{bmatrix} x_0 \\ x_1 \end{bmatrix}$, $$\begin{bmatrix} h_{0,0} & h_{0,1} \\ h_{1,0} & h_{1,1} \end{bmatrix}, \text{and } \begin{bmatrix} n_0 \\ n_1 \end{bmatrix}$$

respectively after QR decomposition.

For the first stage distance computations in EQ. (6), the last row corresponding to a single non-zero entry in the matrix R is evaluated for all possible values of $s_1$ from the constellation using the following distance metric computation:

$$D_{s_1} = |y_1 - r_{1,1} s_1|^2 \quad (7)$$

Figure 3:
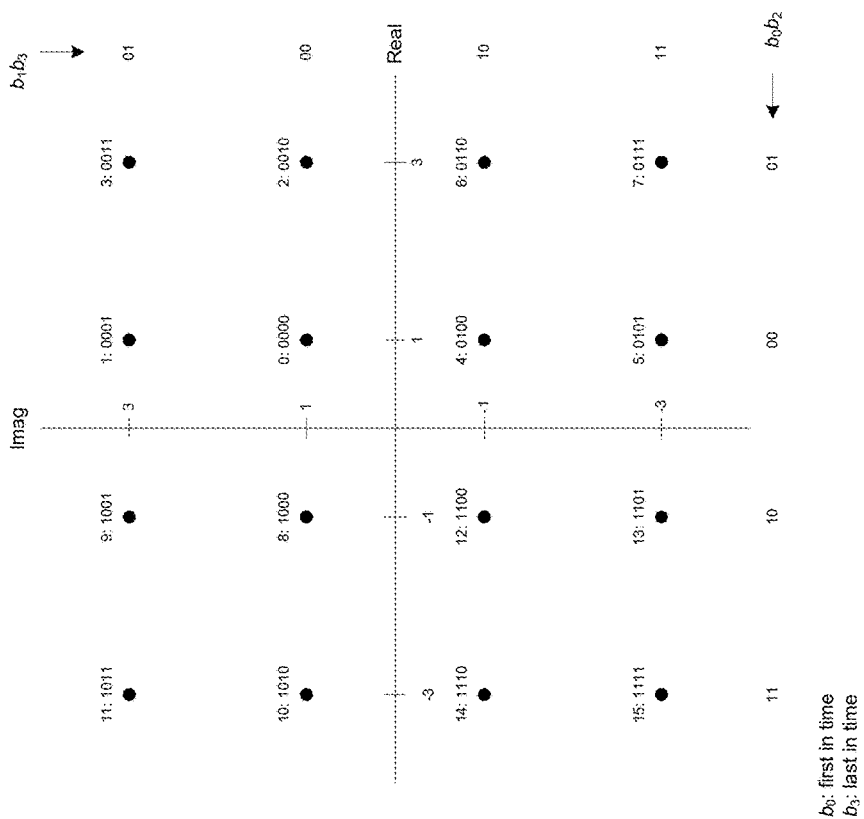
FIG. 3 illustrates the constellation of 16-QAM, which may be employed with aspects of the disclosure described herein.
Figure 4:
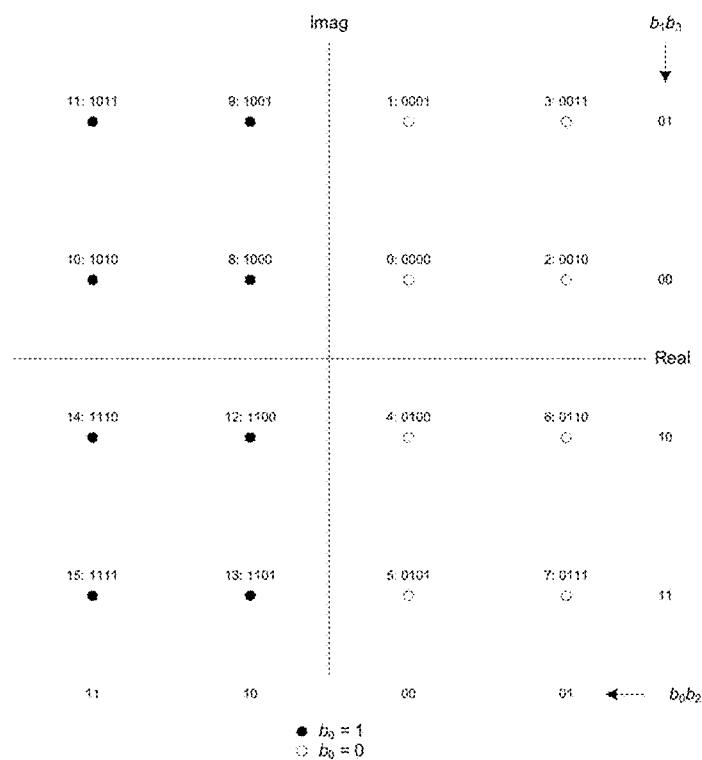
FIG. 4 illustrates the partitioning of 16-QAM constellation for Log-Likelihood Ratio computation which may be employed with aspects of the disclosure described herein.
Figure 4:
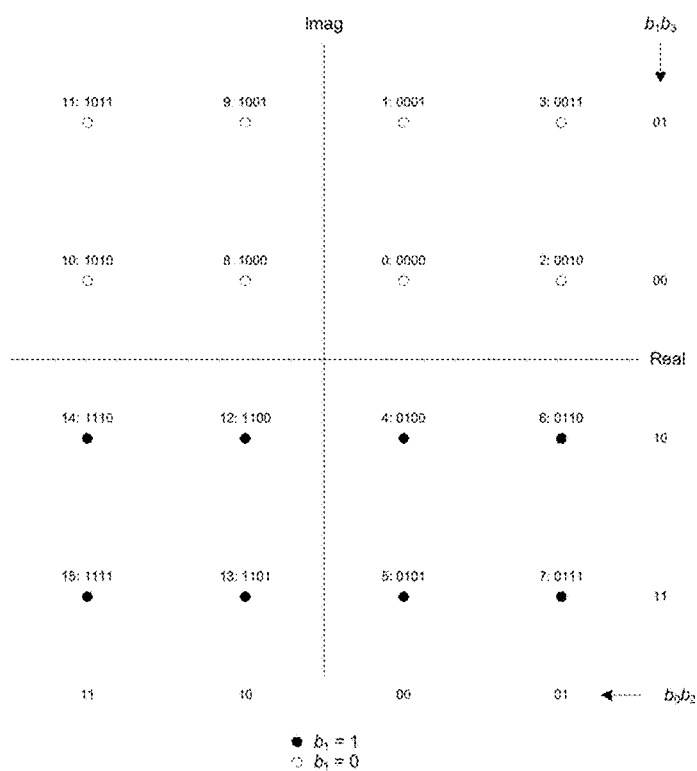
Figure 5:
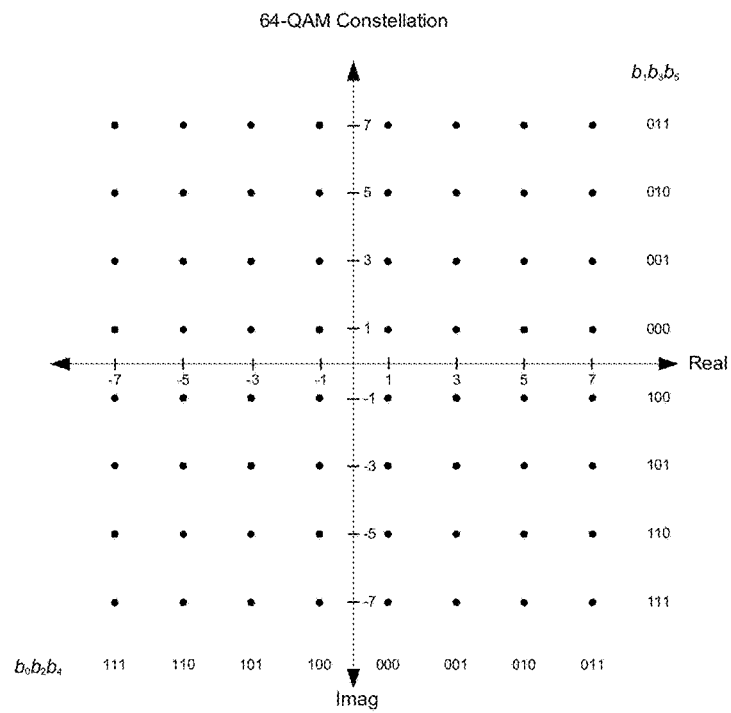
FIG. 5 illustrates the QPSK, 16-QAM, and 64-QAM constellations which may be employed with aspects of the disclosure described herein.
Figure 5:
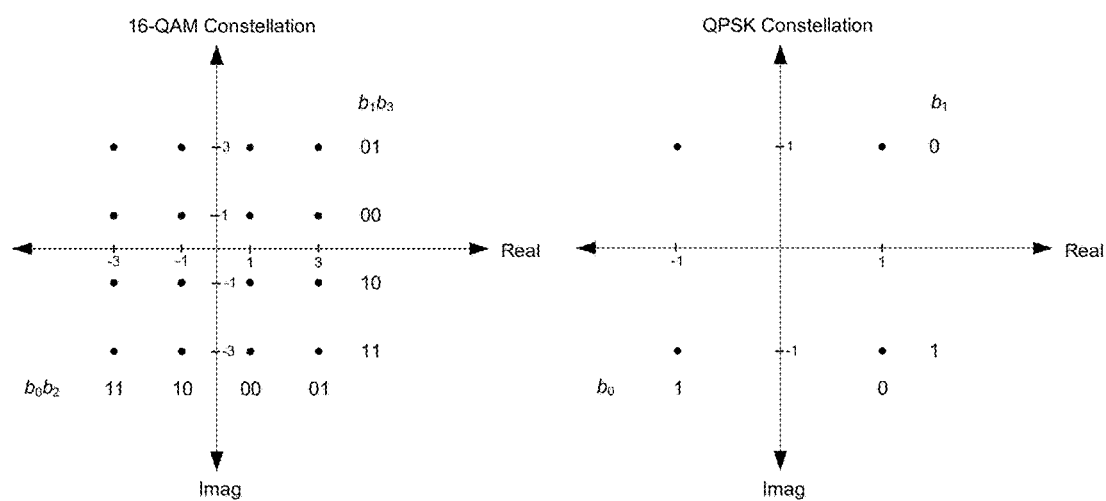

The transformed received signal $y_1$ and the element $r_{1,1}$ of the matrix R are complex and in general can have any value within the specified resolution of the data type of a particular variable. The modulation symbol $s_1$ is chosen from a fixed set of constellation symbols. For example, from FIG. 3, in case of 16-QAM there are only 16 different values a symbol can take.

For the case of 16-QAM constellation, in the first stage of a tree search SM-MIMO decoder, there are 16 distance metrics to be computed. Depending on implementation architecture, these distance metrics may be computed in parallel. For example, four distance metrics corresponding to four symbols from the 16-QAM constellation may be computed in parallel.

Figure 6:
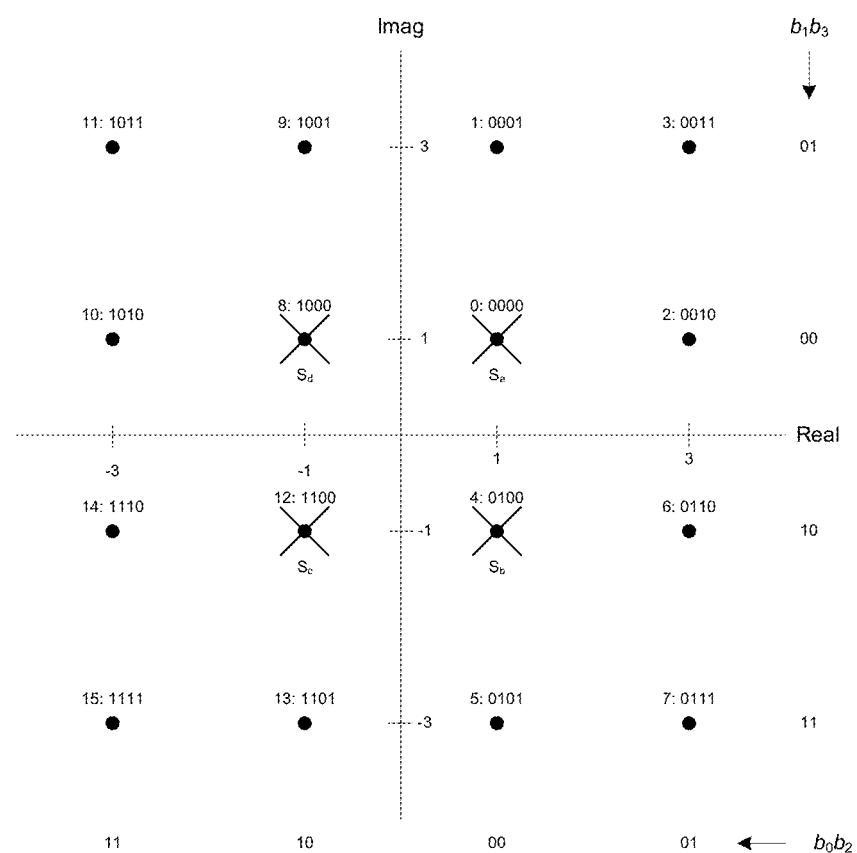
FIG. 6 illustrates a particular subset of four symbols chosen from the 16-QAM constellation for distance computation and for minimum distance metric computation according to the aspects of the present disclosure.

According to an aspect of the present disclosure, the symbols chosen for distance computation in a given computation cycle are such that the symmetry of the constellation is used to reduce the actual number of multiplications and additions/subtractions to perform the distance computations as shown in FIG. 6, where four symbols denoted as $S_a$, $S_b$, $S_c$, and $S_d$ are used in a first subset of symbol for distance computations. Also, the symbols are chosen such that the binary codeword for each symbol is such that the multiple parallel hypotheses for minimum distance can be performed in parallel without requiring multi-port access to each of the registers holding the minimum distance metric for any of the bits as shown in FIG. 7.

Figure 7:
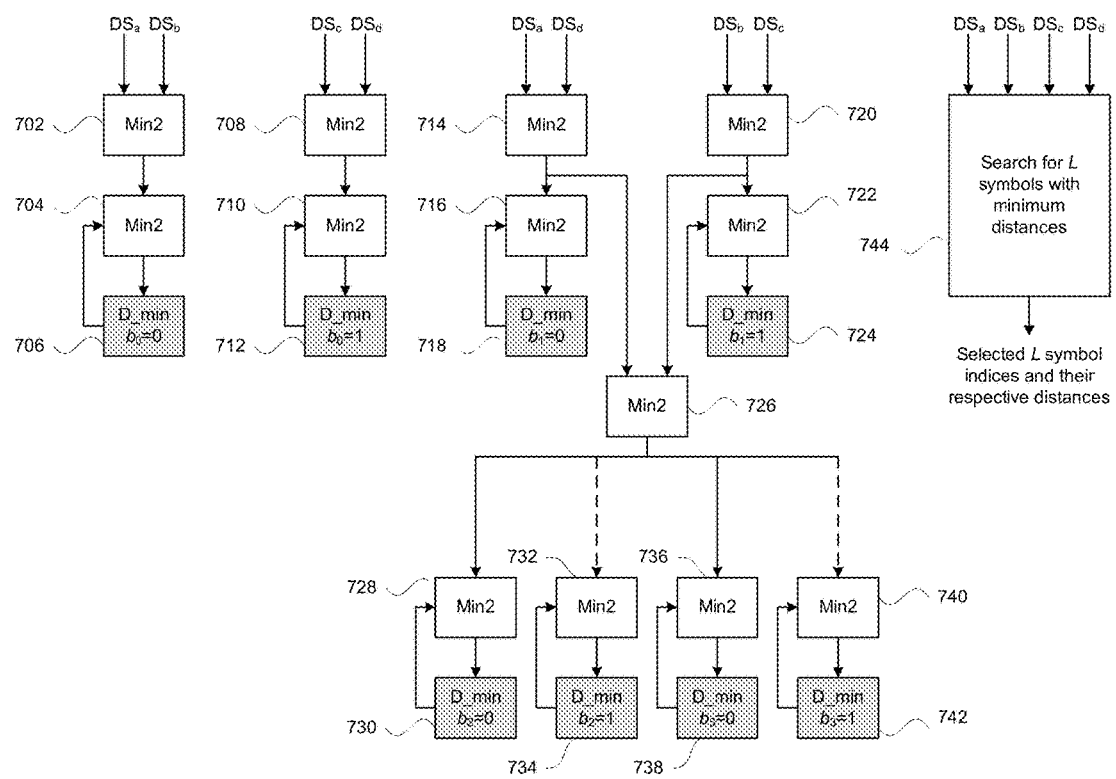
FIG. 7 illustrates the computation of minimum distances for each bit from the computed distance metrics for the selected subset of four symbols from the 16-QAM constellation according to the aspects of the present disclosure.

According to an aspect of the present disclosure, using the four distance metrics $DS_a$, $DS_b$, $DS_c$ and $DS_d$, corresponding to the four selected symbols $S_a$, $S_b$, $S_c$, and $S_d$ from the constellation in FIG. 6, four minimum distance metrics corresponding to bits $b_0$, $b_1$, $b_2$, and $b_3$ being equal to zero are generated by the set of comparators "Min2" in FIG. 7. At the same time four minimum distance metrics corresponding to bits $b_0$, $b_1$, $b_2$, and $b_3$ being equal to one are generated by the using the same comparators.

According to an aspect of the present disclosure, for bit $b_0$, in the chosen subset of four symbols, there are only two symbols $S_a$ and $S_b$ with bit $b_0=0$ as illustrated in FIG. 6. Therefore, the minimum of the distances $DS_a$ and $DS_b$ is the minimum distance metric for bit $b_0=0$. Specifically, the comparator Min2 702 accepts two input distance metric values $DS_a$ and $DS_b$ and outputs smaller of the two values and becomes one of the inputs to the comparator Min2 704. The second input to the comparator Min2 704 is from the minimum distance holding register 706 for the bit $b_0=0$. The output of the comparator Min2 704 is stored back into the holding register 706. Similarly, there are only two symbols $S_c$ and $S_d$ with bit $b_0=1$. Therefore, the minimum of the distances $DS_c$ and $DS_d$ is the minimum distance metric for bit $b_0=1$. Similar type of processing is performed on the two input distance metric values $DS_c$ and $DS_d$ using the comparators 708 and 710 and the holding register 712 for the bit $b_0=1$.

According to an aspect of the present disclosure, for bit $b_1$, in the chosen subset of four symbols, there are only two symbols $S_a$ and $S_d$ with bit $b_1=0$. Therefore, the minimum of the distances $DS_a$ and $DS_d$ is the minimum distance metric for bit $b_1=0$. Similarly, there are only two symbols $S_b$ and $S_c$ with bit $b_1=1$. Therefore, the minimum of the distances $DS_b$, and $DS_c$ is the minimum distance metric for bit $b_1=1$. Similar processing is performed for bit $b_1$ using the four distance metrics $DS_a$, $DS_b$, $DS_c$ and $DS_d$ as input and the four comparators 714, 716, 720, and 722 and the two holding registers 718 and 724.

According to an aspect of the present disclosure, for bit $b_2$, in the chosen subset of four symbols, all four symbols have bit $b_2=0$ and no symbol with bit $b_2=1$. Therefore, the minimum of all the four distances is the minimum distance metric for bit $b_2=0$. The output of the comparator 714 and the comparator 720 are input to the comparator 726 whose output provides the minimum over all four distance metrics. The output of the comparator is input to the comparator 728. The second input to the comparator 728 is the output of the minimum distance holding register 730 for the bit $b_2=0$. The output of the comparator 728 is stored back into the holding register 730. Since there is no symbol with bit $b_2=1$, the minimum distance metric for bit $b_2=1$ cannot be updated. According to an aspect of the present disclosure, the comparator 732 may be disabled or unused when a subset of symbols, for example, the first subset is selected such that the selected subset may not contain any symbol with bit $b_2=1$. This is shown by a dashed line input to the comparator 732 in FIG. 7.

According to an aspect of the present disclosure, for bit $b_3$, in the chosen subset of four symbols, all four symbols have bit $b_3=0$ and no symbol with bit $b_3=1$. Therefore, the minimum of all the four distances is the minimum distance metric for bit $b_3=0$. The output of the comparator 726, which is the minimum over all four distance metrics, is input to the comparator 736. The second input to the comparator 736 is the output of the minimum distance holding register 738 for the bit $b_3=0$. The output of the comparator 728 is stored back into the holding register 738. Since there is no symbol with bit $b_3=1$, the minimum distance metric for bit $b_3=1$ cannot be updated. According to an aspect of the present disclosure, the comparator 740 may be disabled or unused when a subset of symbols, for example, the first subset, is selected such that the selected subset may not contain any symbol with bit $b_3=1$. This is shown by a dashed line input to the comparator 740 in FIG. 7.

Figure 8:
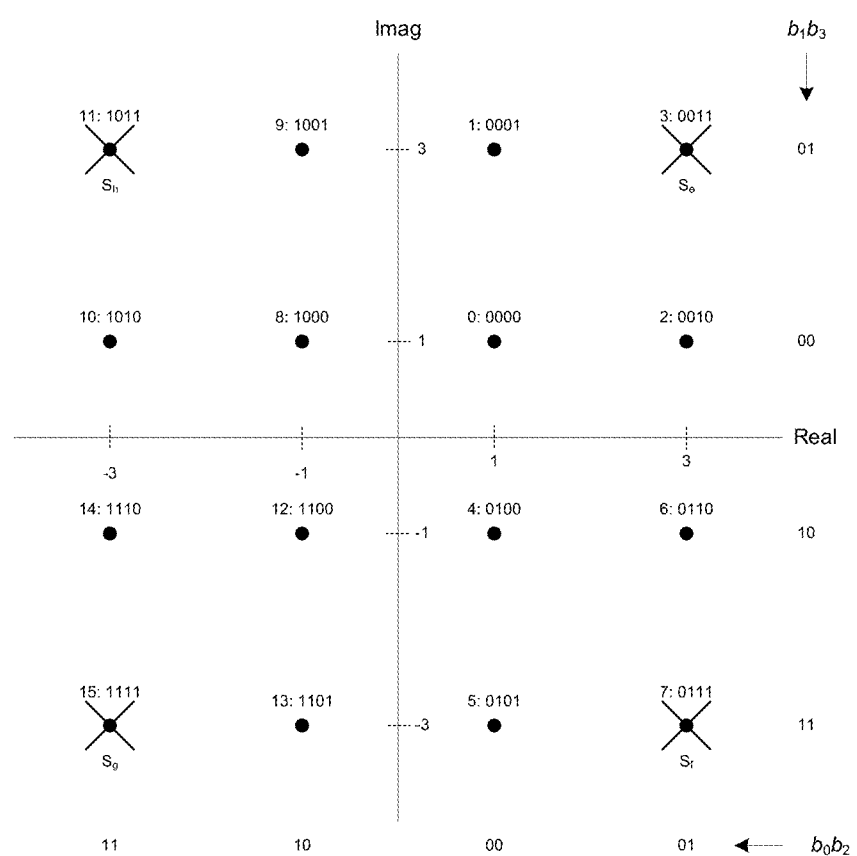
FIG. 8 illustrates another particular subset of four symbols chosen from the 16-QAM constellation for distance computation and for minimum distance metric computation according to the aspects of the present disclosure.

According to an aspect of the present disclosure, in the next processing cycle, a different subset of four symbols from the 16-QAM constellation denoted as $S_e$, $S_f$, $S_g$, and $S_h$ is used as shown in FIG. 8. Four distance metrics $DS_e$, $DS_f$, $DS_g$ and $DS_h$ for these chosen symbols are computed first and then the minima are selected as described below.

According to an aspect of the present disclosure, for bits $b_0$ and $b_1$ the processing remains the same as the processing for the first subset of four symbols as illustrated in FIG. 6 and FIG. 7.

According to an aspect of the present disclosure, for bit $b_2$, in the chosen subset of four symbols, all four symbols have bit $b_2=1$ and no symbol with bit $b_2=0$. Therefore, the minimum of all the four distances is the minimum distance metric for bit $b_2=1$. Since there is no symbol with bit $b_2=0$, the minimum distance metric for bit $b_2=0$ cannot be updated. According to an aspect of the present disclosure, the comparator 728 may be disabled or unused when a subset of symbols, for example, the first subset, is selected such that the selected subset may not contain any symbol with bit $b_2=0$. This is shown by a dashed line input to the comparator 728 in FIG. 9.

According to an aspect of the present disclosure, for bit $b_3$, in the chosen subset of four symbols, all four symbols have bit $b_3=1$ and no symbol with bit $b_3=0$. Therefore, the minimum of all the four distances is the minimum distance metric for bit $b_3=1$. Since there is no symbol with bit $b_3=0$, the minimum distance metric for bit $b_3=0$ cannot be updated. According to an aspect of the present disclosure, the comparator 736 may be disabled or unused when a subset of symbols, for example, the first subset, is selected such that the selected may not contain any symbol with bit $b_3=0$. This is shown by a dashed line input to the comparator 736 in FIG. 9.

Figure 9:
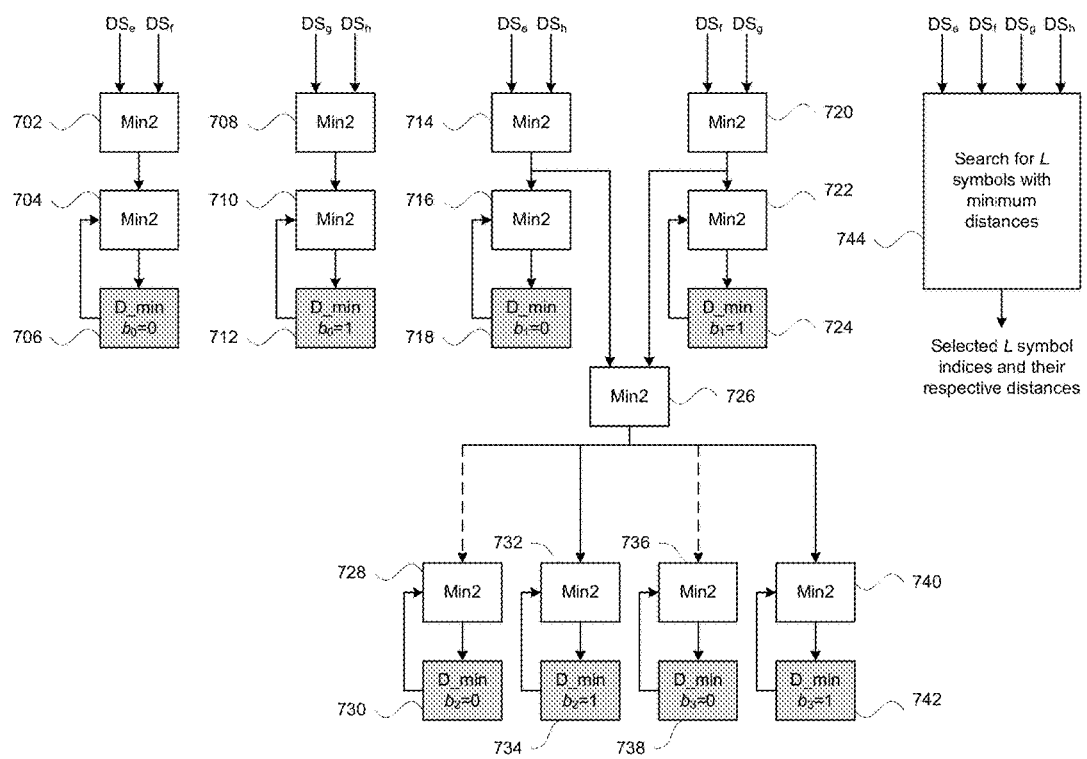
FIG. 9 illustrates the computation of minimum distances for each bit from the computed distance metrics for another selected subset of four symbols from the 16-QAM constellation according to the aspects of the present disclosure.

Note that FIG. 7 and FIG. 9 are identical except for the illustration of the metrics that may be updated and the metrics that may not be updated. Furthermore, the same exact hardware units may be used for the operations described in FIGS. 7 and 9.

Note that for the first subset of four minimum distance metrics, the holding registers for each of the bits do not have any previous value with which to compare. According to an aspect of the present disclosure, at the beginning of processing for each stage of the tree search, the holding registers are initialized with a maximum value according to the bit-width of the register. This ensures that the first time the comparison is made with the holding register contents, the initial value is overwritten with the newly computed minimum distance metric.

When the next subset of minimum distance metrics are computed, some of the holding registers may already have minimum distance metrics from a previous subset of four distance metrics. Therefore, the holding register may be updated only if one of the new subset of four distance metrics is lower than a previously stored minima. This process of determining minimum distances metrics for respective subsets of four symbols continues until all 16 distance metrics are processed. In case of 16-QAM constellation, this requires four steps, with four distances computed in each step. Note that as shown in FIG. 7, for the first subset of symbols, the minimum distance holding registers for bit $b_2=1$ and bit $b_3=1$ are not updated. These registers will retain the original initialized value. When the second subset of four distance metrics are computed, the minimum distance holding registers for bit $b_2=1$ and bit $b_3=1$ are updated. This method ensures that the global minimum for each of the bit value equal to zero and equal to one are available after all the symbols in the constellation are processed. The selection of the next subset of four symbols from the constellation is done in such a way that the same set of scenarios as described above for the first or second subset of symbols applies for the minimum distance metric computations. In this manner, the minimum distance metric for each bit being equal to 0 and being equal to 1 is obtained after four steps in case of 16-QAM constellation.

In a tree search algorithm for the 16-QAM constellation embodiment, to reduce complexity, for subsequent stages of processing as described below, a subset of symbols comprising L symbols (L≤M), from the first stage of processing corresponding to L globally smallest values of distance metric $D_{s1}$ may be considered, i.e., smallest distance metrics without considering whether a particular bit is equal to 0 or 1. To facilitate selection of the subset of L symbols, for each processing cycle of a subset of symbols, the subset of distance metrics computed may be input to the processing block 744 (see FIGS. 7 and 9), which may store the distance metrics for all the constellation points when distance metrics are generated, such as at each clock cycle, for a given transformed received signal. After the distance metrics for all the symbols in a constellation are generated and input to the processing block 744, a search may be performed and an output of L smallest distance metrics and the symbol indices respectively associated therewith may be generated. The processing block 744 may search for L smallest distance metrics on an incremental basis when a subset of distance metrics are input to the block, and may output the final L smallest distance metrics and the symbol indices respectively associated therewith after distance metrics for all constellation points for the given transformed received signal have been input.

Figure 10:
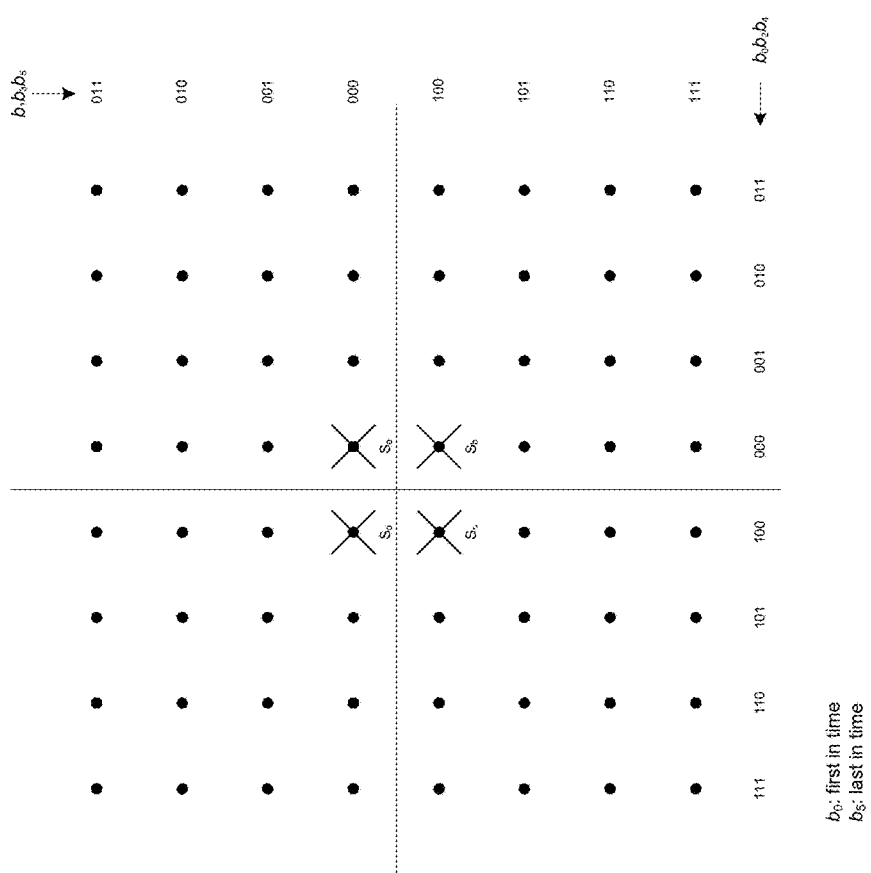
FIG. 10 illustrates a particular subset of four symbols chosen from the 64-QAM constellation for distance computation and for minimum distance metric computation according to the aspects of the present disclosure.
Figure 11:
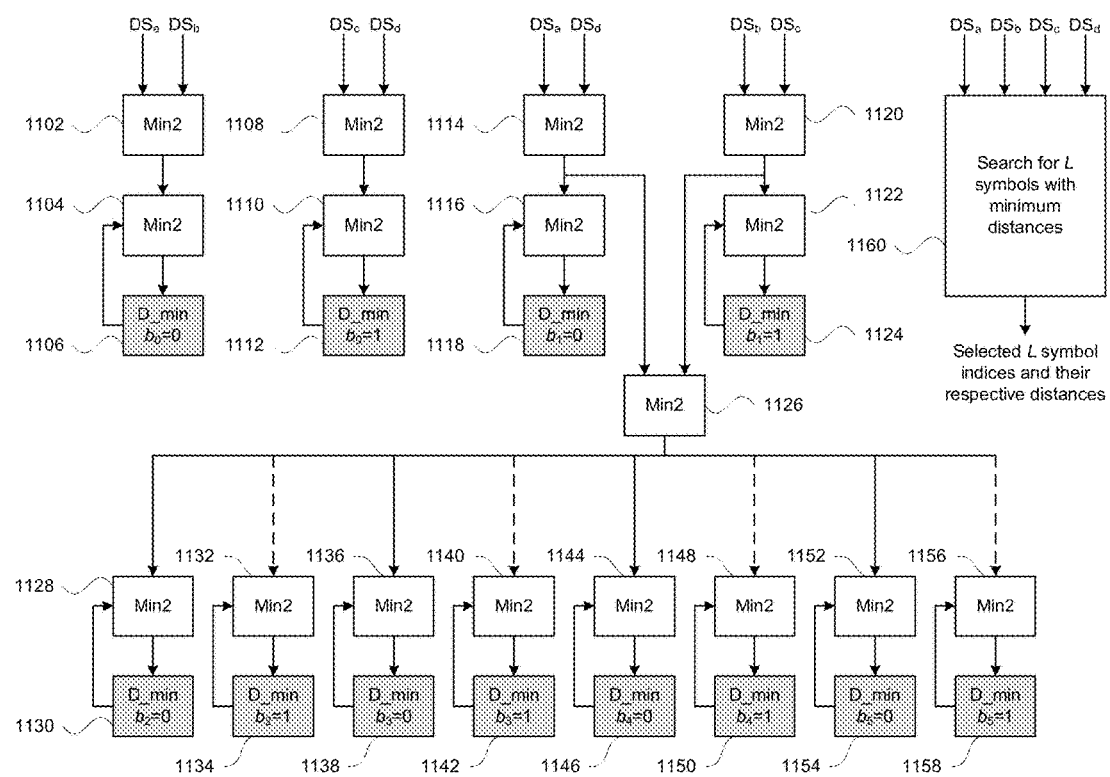
FIG. 11 illustrates the computation of minimum distances for each bit from the computed distance metrics for the selected subset of four symbols from the 64-QAM constellation according to the aspects of the present disclosure.

According to an aspect of the present disclosure, for the case of 64-QAM constellation, a similar procedure as that of 16-QAM may be followed. According to an aspect of the present disclosure, FIG. 10 shows the subset of four symbols chosen for computing distance metrics for the first step. According to an aspect of the present disclosure, FIG. 11 shows how the four distance metrics are used to compute the minimum distances for bits $b_0$ through $b_5$ being equal to 0 and being equal to 1. For the subset of four symbols illustrated in FIG. 10, it includes symbols with bit $b_0=0$ and $b_0=1$. Similarly, the subset includes symbols with bit $b_1=0$ and $b_1=1$. For the bits $b_2$, $b_3$, $b_4$, and $b_5$, the set of symbols is such that only the value of 0 is possible. Therefore, the minimum distances corresponding to bits $b_2$, $b_3$, $b_4$, and $b_5$ being equal to 1 may not be updated. According to an aspect of the present disclosure, similarly as described above for 16-QAM constellation, the comparators 1132, 1140, 1148 and 1156 may be disabled or unused when a subset of symbols is selected such that the selected subset may not contain any symbol with bit $b_2=1$, $b_3=1$, $b_4=1$, and $b_5=1$ respectively. This is illustrated in FIG. 11 by dashed input lines to the comparators 1132, 1140, 1148 and 1156 for the bits $b_2$, $b_3$, $b_4$, and $b_5$ being equal to 1. The rest of the processing remains similar to the case of 16-QAM illustrated in FIG. 7.

Figure 12:
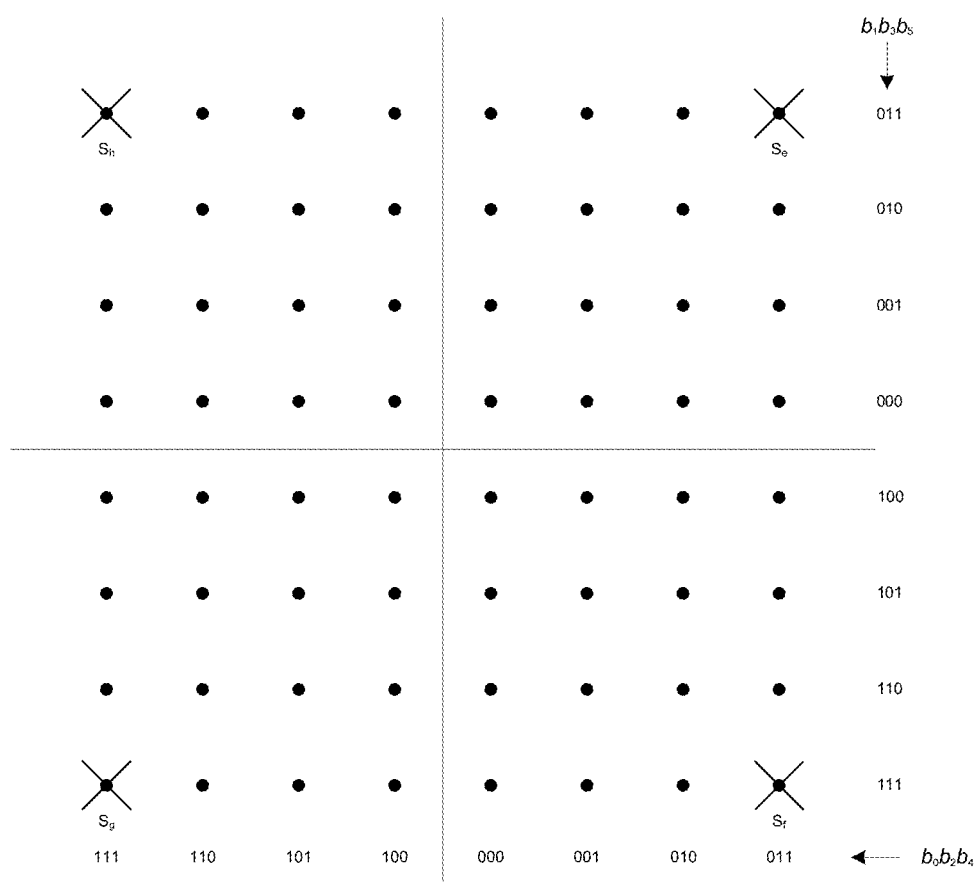
FIG. 12 illustrates another particular subset of four symbols chosen from the 64-QAM constellation for distance computation and for minimum distance metric computation according to the aspects of the present disclosure.
Figure 13:
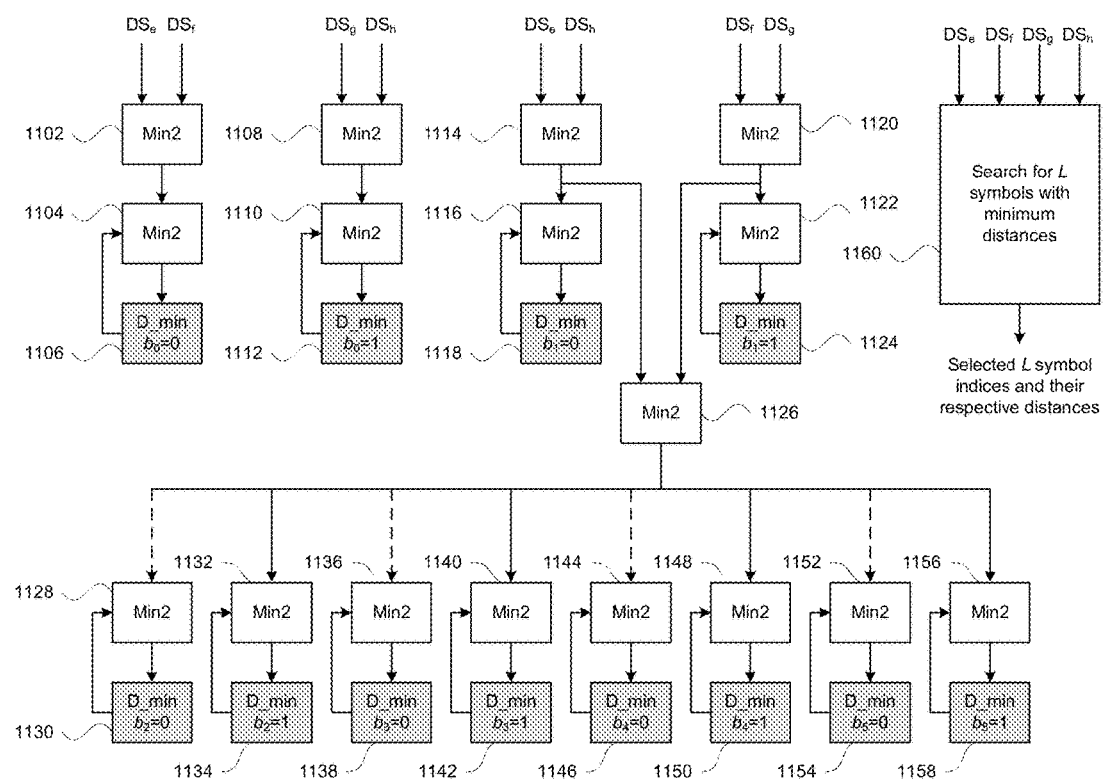
FIG. 13 illustrates the computation of minimum distances for each bit from the computed distance metrics for another selected subset of four symbols from the 64-QAM constellation according to the aspects of the present disclosure.

According to an aspect of the present disclosure, FIG. 12 shows a different subset of four symbols chosen for computing distance metrics for the next step of 64-QAM constellation. FIG. 13 shows how the four distance metrics are used to compute the minima for bits $b_0$ through $b_5$ being equal to 0 and being equal to 1. For the subset of four symbols illustrated in FIG. 12, it includes symbols with bit $b_0=0$ and $b_0=1$. Similarly, it includes symbols with bit $b_1=0$ and $b_1=1$. For the bits $b_2$, $b_3$, $b_4$, and $b_5$, the set of symbols is such that only value of 1 is possible. Therefore, the minimum distances corresponding to bits $b_2$, $b_3$, $b_4$, and $b_5$ being equal to 0 may not be updated. According to an aspect of the present disclosure, the comparators 1128, 1136, 1144 and 1152 may be disabled or unused when a subset of symbols is selected such that the selected subset may not contain any symbol with bit $b_2=0$, $b_3=0$, $b_4=0$, and $b_5=0$ respectively. This is illustrated in FIG. 13 by dashed input lines to the comparators 1128, 1136, 1144 and 1152 for the bits $b_2$, $b_3$, $b_4$, and $b_5$ being equal to 0. The rest of the processing remains similar to the case of 16-QAM illustrated in FIG. 9.

Note that FIG. 11 and FIG. 13 are identical except for the illustration of the metrics that may be updated and the metrics that may not be updated. The same exact hardware units may be used for the operations described in FIGS. 11 and 13. According to an aspect of the present disclosure, the same exact hardware may be used for QPSK, 16-QAM, and 64-QAM constellation with the selection of subsets of symbols according to the aspects of the present disclosure. In case the hardware illustrated in FIG. 11 or 13 is used for QPSK or 16-QAM constellations, some portion of the hardware may remain unused.

These steps of computing four distance metrics and from these distance metrics computing the minimum distance for each bit being equal to 0 and being equal to 1, are repeated eight times to compute distance metrics for all 64 symbols in the 64-QAM constellation and the global minimum distance metrics for each bit being equal to 0 and being equal to 1.

In a tree search algorithm for the 64-QAM constellation embodiment, to reduce complexity, for subsequent stages of processing, a subset of symbols comprising L symbols (L≤M), from the first stage of processing corresponding to L globally smallest values of distance metric $D_{s1}$ may be considered, i.e., smallest distance metrics without considering whether a particular bit is equal to 0 or 1. To facilitate selection of the subset of L symbols, for each processing cycle of a subset of symbols, the subset of distance metrics computed may be input to the processing block 1160 (see FIGS. 11 and 13), which may store the distance metrics for all the constellation points when distance metrics are generated, such as for each clock cycle for a given transformed received signal. After the distance metrics for all the symbols in a constellation are generated and input to the processing block 1160, a search may be performed and an output of L smallest distance metrics and the symbol indices respectively associated therewith may be generated. The processing block 1160 may search for L smallest distance metrics on an incremental basis when a subset of distance metrics are input to it and may output the final L smallest distance metrics and the symbol indices respectively associated therewith after distance metrics for all constellation points for the given transformed received signal have been input.

In the tree search algorithms, all the symbols in the constellation are used for distance computations in a first stage, such as described above for the 16- and 64-QAM in connection with the text accompanying the descriptions of FIGS. 7 and 9 and FIGS. 11 and 13, respectively. However, to reduce complexity, for subsequent stages of processing only a few, say L, of the symbols from the first stage of distance computation processing corresponding to L smallest values of distance metric $D_{s1}$ may be considered. In case of two multiplexed data streams in 2×2 SM-MIMO with 64-QAM in both streams, for example, only the top eight symbols with the lowest distance metrics from the first stage of processing may be considered in conjunction with a second stage of distance computation processing. Therefore, instead of computing all 64×64=4096 cumulative distance metrics, only 64×8=512 cumulative distance metrics may need to be computed. The L symbols from the first stage of processing to be used for the second stage processing may be determined by searching for the symbols corresponding to the smallest distance metric $D_{s1}$ from the distance metrics for all the symbols of a given constellation. This search for the L symbols from the first stage with the smallest distance metric $D_{s1}$ may be performed according to the method described in U.S. application Ser. No. 14/925,006, filed Oct. 28, 2015, incorporated by reference herein. The search for the L symbols from the first stage with the smallest distance metric $D_{s1}$ may be performed in parallel to the search for the minimum distance metrics corresponding to bits associated with symbols being equal to zero or one. The same set of distance metrics $DS_a$, $DS_b$, $DS_c$ and $DS_d$ or $DS_e$, $DS_f$, $DS_g$ and $DS_h$ may be input to both the search units.

For the second stage distance computations, corresponding to first row in EQ. (6), the L selected symbols from the first stage corresponding to $s_1$ are substituted one at a time into the EQ. (6). The first row of EQ. (6) is then evaluated for all possible values of $s_0$ from the constellation. The cumulative distance metric $(D_{s1}+D_{s0})$ is then used to determine the transmitted symbol sequence $(s_0, s_1)$. The distance metric $D_{s0}$ for the first row of EQ. (6) is given as follows:

$$D_{s0}=|y_0-r_{0,0}s_0-r_{0,1}s_1|^2 \quad (8)$$

In EQ. (8) the transformed received signal $y_0$ and the element $r_{0,1}$ of the matrix R are complex and in general can have any value within the specified bit width for a variable. The modulation symbol $s_0$ is chosen from a fixed set of values forming the constellation. The term $r_{0,0}$ may be real based on QR decomposition. For each symbol $s_1$, i.e., $(r_{0,1}s_1)$, and all possible values $s_0$, distance metric $D_{s0}$ may be computed. The term $(r_{0,1}s_1)$ may be computed only L times. Each value of $(r_{0,1}s_1)$ may be reused with all possible values of $(r_{0,0}s_0)$.

Figure 14:
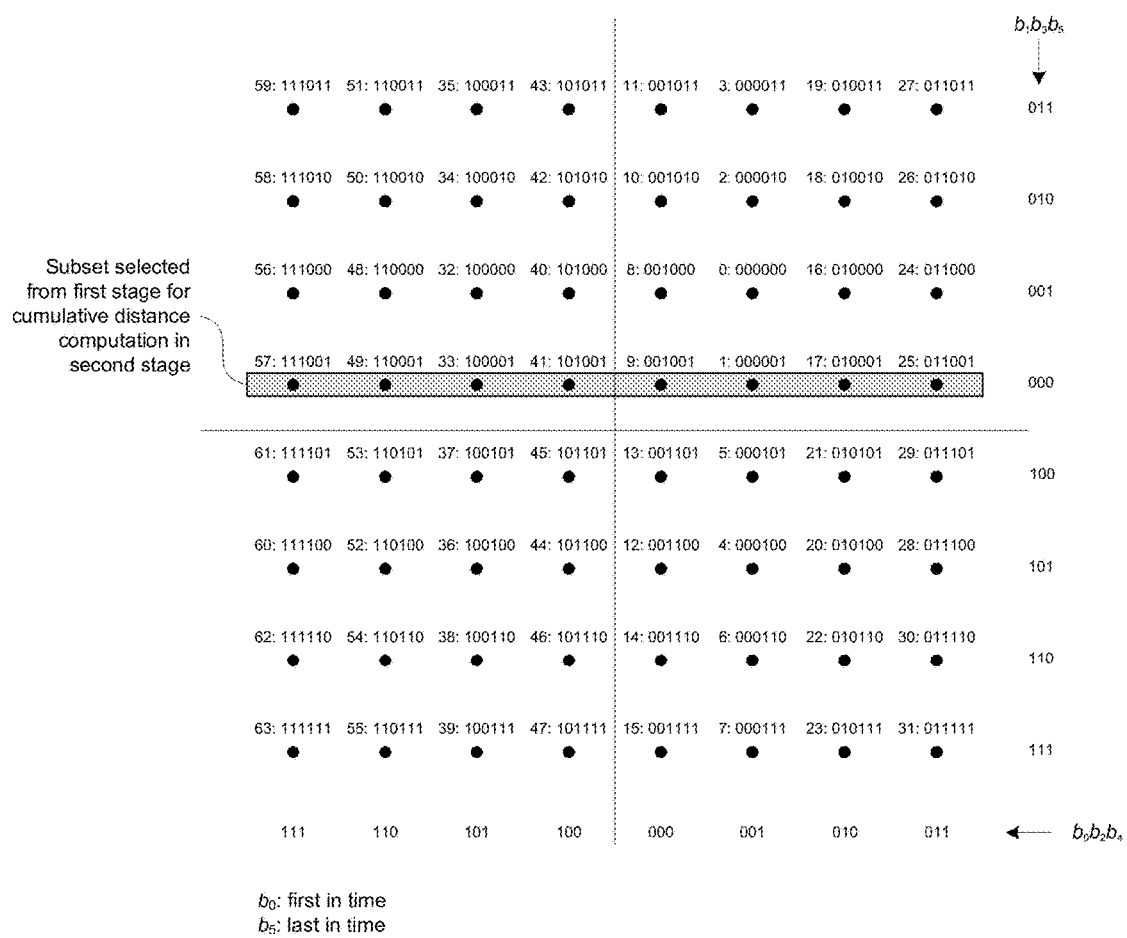
FIG. 14 illustrates the particular subset of symbols chosen from first stage processing for distance computation in the next stage of processing.

According to an aspect of the present disclosure, when the cumulative distance computation for the second stage is performed, the minimum cumulative distance metrics for each of the bits of the symbols from the second stage may be selected according to the same method as described for the first stage. However, the subset of symbols used from the first stage for cumulative distance metrics for the second stage, may not have all the bit positions with values equal to 0 and equal to 1. For example, if the L=8 symbols from the first stage that are used in the second stage for cumulative distance metrics computations are as illustrated in FIG. 14, there are no symbols with the bits $b_1=1$, $b_3=1$, and $b_5=1$. When this scenario occurs, the minimum cumulative distance metrics for bits $b_1=1$, $b_3=1$, and $b_5=1$ retain the initialized maximum value when the second stage computation is performed. When such a scenario arises, if the LLRs are computed with the initialized maximum value in the holding register, the LLRs may not be reliable and may lead to inferior FEC decoding performance.

Figure 15:
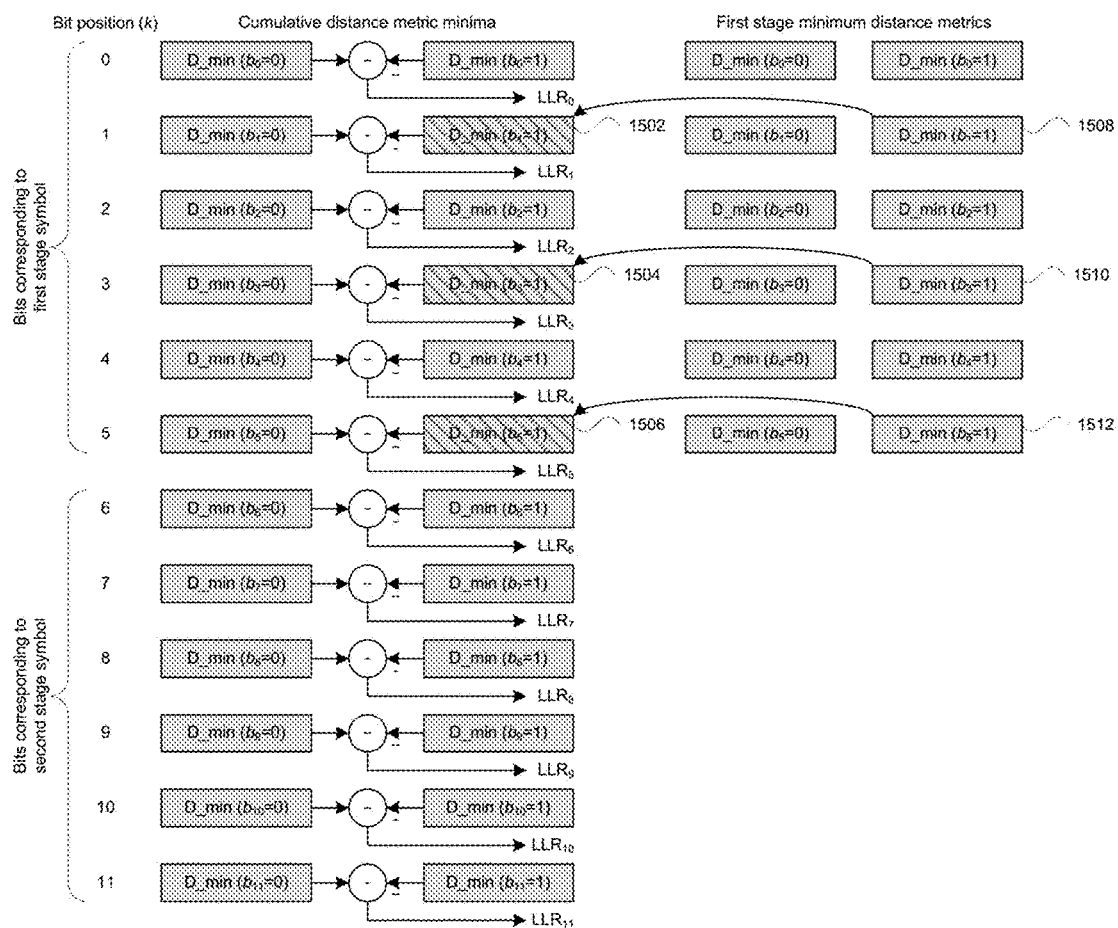
FIG. 15 illustrates the LLR computation method according to the aspects of the present disclosure for the case of tree search based SM-MIMO decoder with missing distance metrics for the counter-hypotheses.

The LLR computation is performed after all the minimum distances are computed for all the symbol vectors. FIG. 15 illustrates all the available minimum distances corresponding to all 12 bits $b_0$ to $b_{11}$ being equal to 0 or being equal to 1. The LLRs are obtained by subtracting the minimum distance for a particular bit being equal to 1 from the minimum distance for the same bit being equal to 0.

According to an aspect of the present disclosure, for those bits for which the minimum cumulative distance metrics are not available in second stage processing of a tree search method, the LLRs are computed using the minimum distance metrics selected during the first stage of the processing. Since the first stage of processing considers all the symbols of a constellation for distance metric computations, the minimum distance metrics for all bits being equal to zero or equal to one are always available. The LLRs generated using this method are more reliable and may lead to improved FEC decoding performance.

As noted above, some of the minimum distances corresponding to some bits from the first stage being equal to 0 or being equal to 1 may not be available. For example, if the L=8 symbols selected from first stage are as per the case illustrated in FIG. 14, the minimum distance metrics for the bits $b_1=1$, $b_3=1$, and $b_5=1$ identified by holding registers 1502, 1504, and 1506 respectively may not be updated at all and may have the highest value to which the holding register may have been initialized at the beginning of second stage minimum distance computation. As per the aspects of the present disclosure described, when such a scenario occurs, the minimum distance metrics for the respective bits with the respective value from the first stage minimum distance metrics are used. Specifically, for the example case illustrated in FIG. 14, the second stage cumulative minimum distance metrics in holding registers 1502, 1504, and 1506 may be replaced by the values in the holding registers 1508, 1510, and 1512 respectively.

Although the present disclosure exemplifies use of the same constellation for the two symbols in an SM-MIMO system at the transmitter and the receiver, the two symbols in an SM-MIMO system may use different constellations. For example, in FIG. 2, the symbol $s_0$ may be drawn from a 16-QAM constellation and the symbol $s_1$ may be drawn from a 64-QAM constellation.

In accordance with such aspects of the present disclosure, the method of soft bit computation in MIMO decoders may be applied to various wireless communication systems such as systems based on the 3rd Generation Partnership Project (3GPP) Long Term Evolution (LTE) and LTE-Advanced, an IEEE 802.16 wireless communication standard, an IEEE 802.11 wireless communication standard, or any other wireless communication system that uses spatial multiplexing.

In accordance with such aspects of the present disclosure, the method of soft bit computation in MIMO decoders may be used is a client terminal or a base station of a wireless communication system. The method disclosed herein enables reduced complexity SM decoding with soft bit computation which in turn leads to reduced silicon area in a semiconductor implementation such as an Application Specific Integrated Circuit (ASIC). The reduced complexity and reduced area may lead to reduced power consumption. The generation of reliable soft bits leads to improved SM-MIMO decoding performance.

By way of example only, the above described method may be implemented in a receiver, e.g., a user device such as a wireless mobile station (MS) 12 as shown in FIG. 1.

Figure 16:
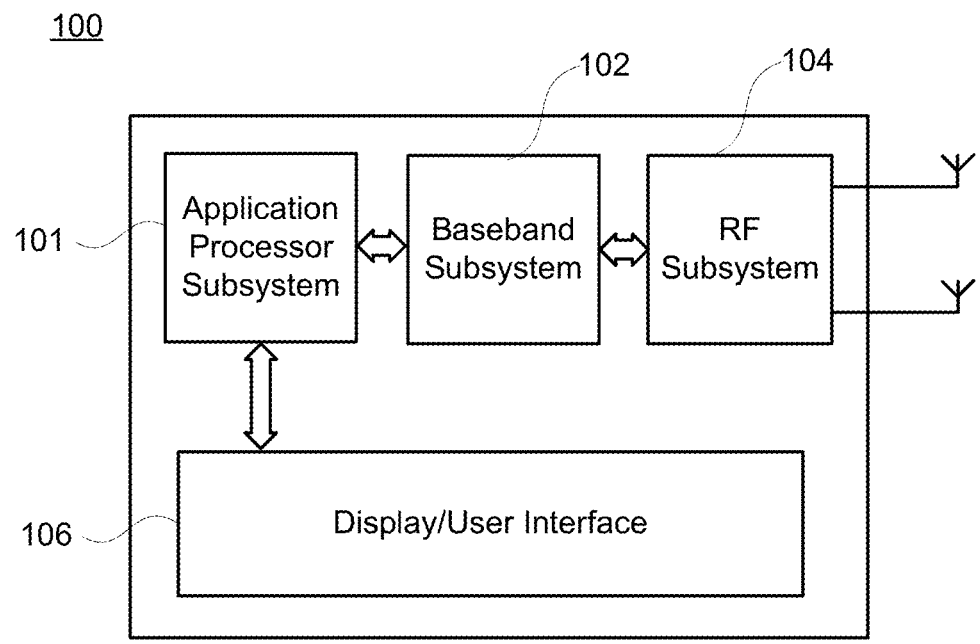
FIG. 16 illustrates a wireless mobile station diagram, which may be employed with aspects of the disclosure described herein.

As shown in FIG. 16, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 17:
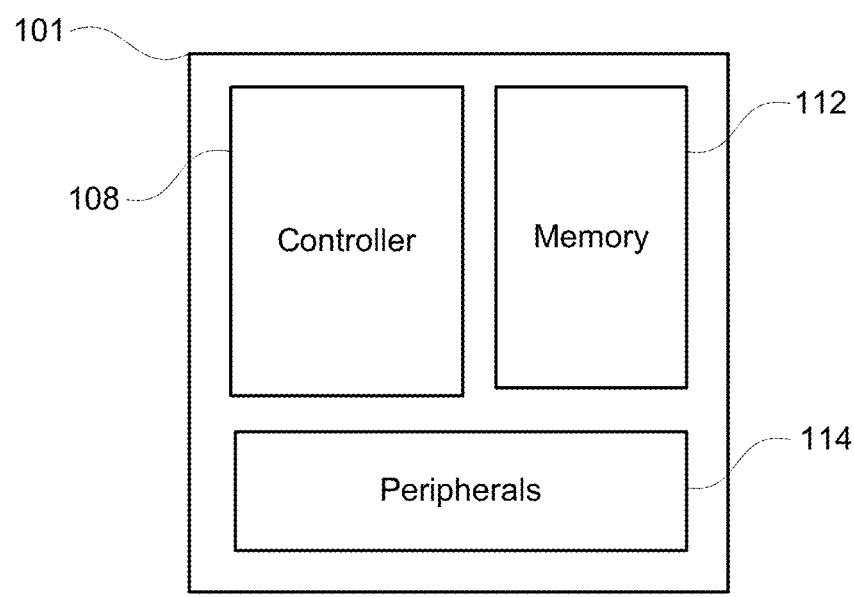
FIG. 17 illustrates an application processor subsystem for a wireless mobile station, which may be employed with aspects of the disclosure described herein.
Figure 18:
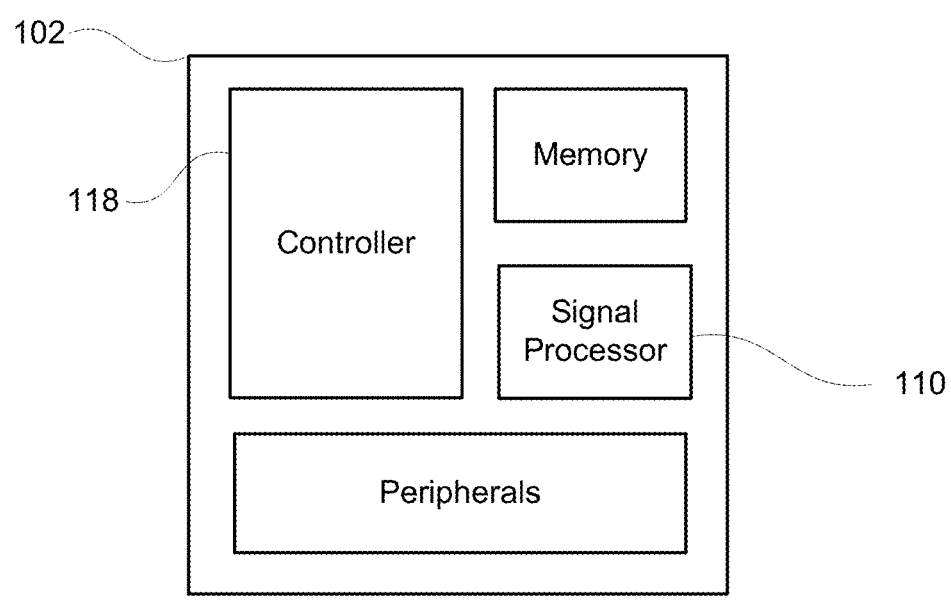
FIG. 18 illustrates a baseband subsystem for a wireless mobile station, which may be employed with aspects of the disclosure described herein.
Figure 19:
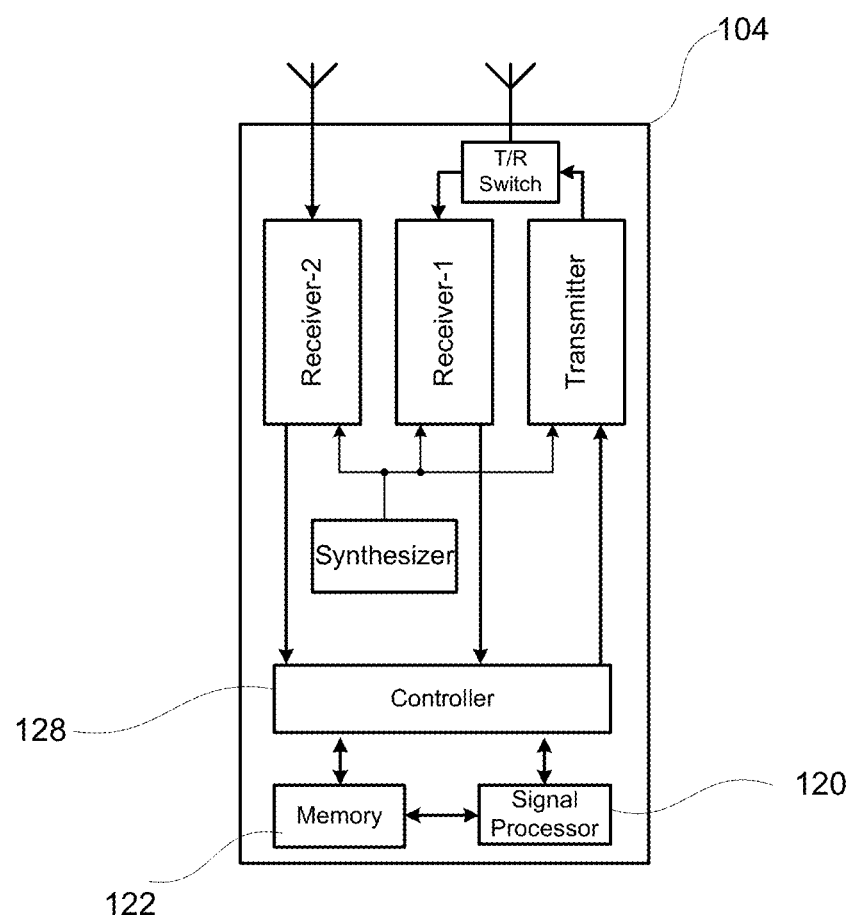
FIG. 19 illustrates an RF subsystem for a wireless mobile station, which may be employed with aspects of the disclosure described herein.

The application processor subsystem 101 as shown in FIG. 17 may include a controller 108 such as a microcontroller, another processor or other circuitry. The baseband subsystem 102 as shown in FIG. 18 may include a controller 118 such as a microcontroller or other processor. The RF subsystem 104 as shown in FIG. 19 may include a controller 128 such as a microcontroller, another processor or other circuitry. The controller 108 desirably handles overall operation of the MS 100. This may be done by any combination of hardware, software and firmware running on the controller 108. Such combination of hardware, software and firmware may embody any methods in accordance with the aspects of the present disclosure.

In FIG. 18 the peripherals 114 such as a full or partial keyboard, video or still image display, audio interface, etc., may be employed and managed through the controller 108.

Aspects of the present disclosure may be implemented in firmware of the controller 108 of the application processor and/or the controller 118 of the baseband subsystem as shown in FIG. 11. In another alternative, aspects of the present disclosure may also be implemented as a combination of firmware and hardware of the application processor subsystem 101 and/or the baseband subsystem 102. For instance, signal processing functionality of any or all of the FIG. 13 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for decoding first and second signals received at a same antenna in a multiple input multiple output (MIMO) communication system,
   wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0, b_1, \ldots, b_{K1-1}$, and
   wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0, b_1, \ldots, b_{K2-1}$,
   the method comprising:
   controlling, by a processing device, a first stage of distance computations, in which the first stage of distance computations includes:
   (I) performing first minimum distance computations for first symbols $S_a$, $S_b$, $S_c$, and $S_d$ corresponding to respective first constellation points of the first constellation, wherein the first minimum distance computations include:
   generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$,
   in which:
   (i) a minimum of the distance metrics $DS_a$ and $DS_b$ determined by a first comparator circuit is input to a first input of a second comparator circuit, (ii) a minimum distance value for the bit $b_0=0$ stored at a first register is input to a second input of the second comparator circuit, and (iii) a minimum of the first input and the second input of the second comparator circuit is determined by the second comparator circuit, output from an output of the second comparator circuit to an input of the first register and stored by the first register as the stored minimum distance value for the bit $b_0=0$,
   (i) a minimum of the distance metrics $DS_c$ and $DS_d$ determined by a third comparator circuit is input to a first input of a fourth comparator circuit, (ii) a minimum distance value for the bit $b_0=1$ stored at a second register is input to a second input of the fourth comparator circuit, and (iii) a minimum of the first input and the second input of the fourth comparator circuit is determined by the fourth comparator circuit, output from an output of the fourth comparator circuit to an input of the second register and stored by the second register as the stored minimum distance value for the bit $b_0=1$,
   (i) a minimum of the distance metrics $DS_a$ and $DS_d$ determined by a fifth comparator circuit is input to a first input of a sixth comparator circuit, (ii) a minimum distance value for the bit $b_1=0$ stored at a third register is input to a second input of the sixth comparator circuit, and (iii) a minimum of the first input and the second input of the sixth comparator circuit is determined by the sixth comparator circuit, output from an output of the sixth comparator circuit to an input of the third register and stored by the third register as the stored minimum distance value for the bit $b_1=0$, (i) a minimum of the distance metrics $DS_b$ and $DS_c$ determined by a seventh comparator circuit is input to a first input of a eighth comparator circuit, (ii) a minimum distance value for the bit $b_1=1$ stored at a fourth register is input to a second input of the eighth comparator circuit, and (iii) a minimum of the first input and the second input of the eighth comparator circuit is determined by the eighth comparator circuit, output from an output of the eighth comparator circuit to an input of the fourth register and stored by the fourth register as the stored minimum distance value for the bit $b_1=1$, (i) a minimum of the distance metrics $DS_a$, $DS_b$, $DS_c$ and $DS_d$ determined by a ninth comparator circuit is input to a first input of a tenth comparator circuit, (ii) a minimum distance value for the bit $b_2=0$ stored at a fifth register is input to a second input of the tenth comparator circuit, and (iii) a minimum of the first input and the second input of the tenth comparator circuit is determined by the tenth comparator circuit, output from an output of the tenth comparator circuit to an input of the fifth register and stored by the fifth register as the stored minimum distance value for the bit $b_2=0$, and (i) the minimum of the distance metrics $DS_a$, $DS_b$, $DS_c$ and $DS_d$ from the ninth comparator circuit is input to a first input of an eleventh comparator circuit, (ii) a minimum distance value for the bit $b_3=0$ stored at a sixth register is input to a second input of the eleventh comparator circuit, and (iii) a minimum of the first input and the second input of the eleventh comparator circuit is determined by the eleventh comparator circuit, output from an output of the eleventh comparator circuit to an input of the sixth register stored by the sixth register as the stored minimum distance value for the bit $b_3=0$;

(II) performing second minimum distance computations for second symbols $S_e$, $S_f$, $S_g$, and $S_h$ corresponding to respective first constellation points of the first constellation, wherein the second minimum distance computations include:

generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which:

(i) a minimum of the distance metrics $DS_e$ and $DS_f$ determined by a twelfth comparator circuit is input to a first input of a thirteenth comparator circuit, (ii) the minimum distance value for the bit $b_0=0$ stored at a seventh register is input to a second input of the thirteenth comparator circuit, and (iii) a minimum of the first input and the second input of the thirteenth comparator circuit is determined by the thirteenth comparator circuit, output from an output of the thirteenth comparator circuit to an input of the seventh register and stored by the seventh register as the stored minimum distance value for the bit $b_0=0$, (i) a minimum of the distance metrics $DS_g$ and $DS_h$ determined by a fourteenth comparator circuit is input to a first input of a fifteenth comparator circuit, (ii) the minimum distance value for the bit $b_0=1$ stored at an eighth register is input to a second input of the fifteenth comparator circuit, and (iii) a minimum of the first input and the second input of the fifteenth comparator circuit is determined by the fifteenth comparator circuit, output from an output of the thirteenth circuit to an input of the eighth register and stored by the eighth register as the stored minimum distance value for the bit $b_0=1$, (i) a minimum of the distance metrics $DS_e$ and $DS_h$ determined by a sixteenth comparator circuit is input to a first input of a seventeenth comparator circuit, (ii) the minimum distance value for the bit $b_1=0$ stored at a ninth register is input to a second input of the seventeenth comparator circuit, and (iii) a minimum of the first input and the second input of the seventeenth comparator circuit is determined by the seventeenth comparator circuit, output from an output of the seventeenth comparator circuit to an input of the ninth register and stored by the ninth register as the stored minimum distance value for the bit $b_1=0$, (i) a minimum of the distance metrics $DS_f$ and $DS_g$ determined by an eighteenth comparator circuit is input to a first input of a nineteenth comparator circuit, (ii) the minimum distance value for the bit $b_1=1$ stored at a tenth register is input to a second input of the nineteenth comparator circuit, and (iii) a minimum of the first input and the second input of the nineteenth comparator circuit is determined by the nineteenth comparator circuit, output from an output of the nineteenth comparator circuit to an input of the tenth register and stored by the tenth register as the stored minimum distance value for the bit $b_1=1$, (i) a minimum of the distance metrics $DS_e$, $DS_f$, $DS_g$ and $DS_h$ determined by a twentieth comparator circuit is input to a first input of a twenty-first comparator circuit, (ii) a minimum distance value for the bit $b_2=1$ stored at an eleventh register is input to a second input of the twenty-first comparator circuit, and (iii) a minimum of the first input and the second input of the twenty-first comparator circuit is determined by the twenty-first comparator circuit, output from an output of the twenty-first comparator circuit to an input of the eleventh register and stored by the eleventh register as the stored minimum distance value for the bit $b_2=1$, and (i) the minimum of the distance metrics $DS_e$, $DS_f$, $DS_g$ and $DS_h$ from the twentieth comparator circuit is input to a first input of an twenty-second comparator circuit, (ii) a minimum distance value for the bit $b_3=1$ stored at a twelfth register is input to a second input of the twenty-second comparator circuit, and (iii) a minimum of the first input and the second input of the twenty-second comparator circuit is determined by the twenty-second comparator circuit, output from an output of the twenty-second comparator circuit to an input of the twelfth register and stored by the twelfth register as the stored minimum distance value for the bit $b_3=1$;

controlling, by the processing device, performing a second stage of distance computations including:
for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation,
wherein the L symbols correspond to symbols represented in the first constellation having L lowest minimum distance metrics as determined from the first stage of distance computations, and
when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations; and
controlling, by the processing device, after the first and second stages of distance computations are performed, determining, for each bit b, a Log-Likelihood Ratio (LLR) by subtracting the minimum distance value for the bit b being equal to 1 from the minimum distance value for the bit b being equal to 0, and transmitting the LLR for the each bit b to a Forward Error Correction (FEC) decoder.

2. The method of claim 1, wherein the first symbols are selected such that minimum distance values respectively corresponding to the K1 bits of a codeword for a given symbol corresponding to a given first constellation point of the first constellation can be generated without using each of stored minimum distance values respectively corresponding to the K1 bits of the codeword.

3. The method of claim 1, wherein, for each of the bits b, the stored minimum distance value for a given bit b being each of equal to one and zero is initialized to a maximum value according to a bit-width of a given register in which the stored minimum distance value is stored.

4. The method of claim 1, wherein the first and second symbols are selected such that, after minimum distance computations are performed to generate minimum distance values corresponding to the K1 bits for all symbols represented in the first constellation remaining unprocessed after the first and second minimum distance computations are performed, the stored minimum distance value for each of the bits b being equal to zero and one is other than an original initialized value.

5. The method of claim 4, wherein the minimum distances values are generated for a given selected set of four symbols of the remaining unprocessed symbols by performing the first or second minimum distance computations, according to whether representation of the four symbols of the given selected set in the first constellation corresponds to the representation of the first symbols or the second symbols in the first constellation.

6. The method of claim 1,
wherein the first minimum distance computations for the first symbols are performed without generating the minimum distance values for the bit $b_2=1$ and the bit $b_3=1$, and wherein the second minimum distance computations for the second symbols are performed without generating the minimum distance values for the bit $b_2=0$ and the bit $b_3=0$.

7. The method of claim 1, wherein, when K1 is greater than four,
(i) the performing the first minimum distance computations for the first symbols $S_a$, $S_b$, $S_c$ and $S_d$ includes generating minimum distance values for each bit $b_{i=4 \ to \ K1-1}$ equal to zero, in which a minimum of (a) the minimum of the distance metrics $DS_a$, $DS_b$, $DS_c$ and $DS_d$ and (b) a stored minimum distance value for the bit $b_i=0$, is determined and stored as the stored minimum distance value for the bit $b_i=0$; and
(ii) the performing the second minimum distance computations for the second symbols $S_e$, $S_f$, $S_g$ and $S_h$ includes generating minimum distance values for each bit $b_{i=4 \ to \ K1-1}$ equal to one, in which a minimum of (a) the minimum of the distance metrics $DS_e$, $DS_f$, $DS_g$ and $DS_h$ and (b) a stored minimum distance value for the bit $b_i=1$, is determined and stored as the stored minimum distance value for the bit $b_i=1$.

8. An apparatus for decoding first and second signals received at a same antenna in a multiple input multiple output (MIMO) communication system,
wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0$, $b_1$, ..., $b_{K1-1}$, and
wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0$, $b_1$, ..., $b_{K2-1}$,
the apparatus comprising:
circuitry configured to control:
a first stage of distance computations, in which the first stage of distance computations includes:
(I) performing first minimum distance computations for first symbols $S_a$, $S_b$, $S_c$, and $S_d$ corresponding to respective first constellation points of the first constellation, wherein the first minimum distance computations include:
generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$,
in which:
(i) a minimum of the distance metrics $DS_a$ and $DS_b$ determined by a first comparator circuit is input to a first input of a second comparator circuit, (ii) a minimum distance value for the bit $b_0=0$ stored at a first register is input to a second input of the second comparator circuit, and (iii) a minimum of the first input and the second input of the second comparator circuit is determined by the second comparator circuit, output from an output of the second comparator circuit to an input of the first register and stored by the first register as the stored minimum distance value for the bit $b_0=0$, (i) a minimum of the distance metrics $DS_c$ and $DS_d$ determined by a third comparator circuit is input to a first input of a fourth comparator circuit, (ii) a minimum distance value for the bit $b_0=1$ stored at a second register is input to a second input of the fourth comparator circuit, and (iii) a minimum of the first input and the second input of the fourth comparator circuit is determined by the fourth comparator circuit, output from an output of the fourth comparator circuit to an input of the second register and stored by the second register as the stored minimum distance value for the bit $b_0=1$, (i) a minimum of the distance metrics $DS_a$ and $DS_d$ determined by a fifth comparator circuit is input to a first input of a sixth comparator circuit, (ii) a minimum distance value for the bit $b_1=0$ stored at a third register is input to a second input of the sixth comparator circuit, and (iii) a minimum of the first input and the second input of the sixth comparator circuit is determined by the sixth comparator circuit, output from an output of the sixth comparator circuit to an input of the third register and stored by the third register as the stored minimum distance value for the bit $b_1=0$, (i) a minimum of the distance metrics $DS_b$ and $DS_c$ determined by a seventh comparator circuit is input to a first input of a eighth comparator circuit, (ii) a minimum distance value for the bit $b_1=1$ stored at a fourth register is input to a second input of the eighth comparator circuit, and (iii) a minimum of the first input and the second input of the eighth comparator circuit is determined by the eighth comparator circuit, output from an output of the eighth comparator circuit to an input of the fourth register and stored by the fourth register as the stored minimum distance value for the bit $b_1=1$, (i) a minimum of the distance metrics $DS_a$, $DS_b$, $DS_c$ and $DS_d$ determined by a ninth comparator circuit is input to a first input of a tenth comparator circuit, (ii) a minimum distance value for the bit $b_2=0$ stored at a fifth register is input to a second input of the tenth comparator circuit, and (iii) a minimum of the first input and the second input of the tenth comparator circuit is determined by the tenth comparator circuit, output from an output of the tenth comparator circuit to an input of the fifth register and stored by the fifth register as the stored minimum distance value for the bit $b_2=0$, and (i) the minimum of the distance metrics $DS_a$, $DS_b$, $DS_c$ and $DS_d$ from the ninth comparator circuit is input to a first input of an eleventh comparator circuit, (ii) a minimum distance value for the bit $b_3=0$ stored at a sixth register is input to a second input of the eleventh comparator circuit, and (iii) a minimum of the first input and the second input of the eleventh comparator circuit is determined by the eleventh comparator circuit, output from an output of the eleventh comparator circuit to an input of the sixth register stored by the sixth register as the stored minimum distance value for the bit $b_3=0$;

(II) performing second minimum distance computations for second symbols $S_e$, $S_f$, $S_g$, and $S_h$ corresponding to respective first constellation points of the first constellation, wherein the second minimum distance computations include:

generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which:

(i) a minimum of the distance metrics $DS_e$ and $DS_f$ determined by a twelfth comparator circuit is input to a first input of a thirteenth comparator circuit, (ii) the minimum distance value for the bit $b_0=0$ stored at a seventh register is input to a second input of the thirteenth comparator circuit, and (iii) a minimum of the first input and the second input of the thirteenth comparator circuit is determined by the thirteenth comparator circuit, output from an output of the thirteenth comparator circuit to an input of the seventh register and stored by the seventh register as the stored minimum distance value for the bit $b_0=0$, (i) a minimum of the distance metrics $DS_g$ and $DS_h$ determined by a fourteenth comparator circuit is input to a first input of a fifteenth comparator circuit, (ii) the minimum distance value for the bit $b_0=1$ stored at an eighth register is input to a second input of the fifteenth comparator circuit, and (iii) a minimum of the first input and the second input of the fifteenth comparator circuit is determined by the fifteenth comparator circuit, output from an output of the thirteenth circuit to an input of the eighth register and stored by the eighth register as the stored minimum distance value for the bit $b_0=1$, (i) a minimum of the distance metrics $DS_e$ and $DS_h$ determined by a sixteenth comparator circuit is input to a first input of a seventeenth comparator circuit, (ii) the minimum distance value for the bit $b_1=0$ stored at a ninth register is input to a second input of the seventeenth comparator circuit, and (iii) a minimum of the first input and the second input of the seventeenth comparator circuit is determined by the seventeenth comparator circuit, output from an output of the seventeenth comparator circuit to an input of the ninth register and stored by the ninth register as the stored minimum distance value for the bit $b_1=0$, (i) a minimum of the distance metrics $DS_f$ and $DS_g$ determined by an eighteenth comparator circuit is input to a first input of a nineteenth comparator circuit, (ii) the minimum distance value for the bit $b_1=1$ stored at a tenth register is input to a second input of the nineteenth comparator circuit, and (iii) a minimum of the first input and the second input of the nineteenth comparator circuit is determined by the nineteenth comparator circuit, output from an output of the nineteenth comparator circuit to an input of the tenth register and stored by the tenth register as the stored minimum distance value for the bit $b_1=1$, (i) a minimum of the distance metrics $DS_e$, $DS_f$, $DS_g$ and $DS_h$ determined by a twentieth comparator circuit is input to a first input of a twenty-first comparator circuit, and (ii) a minimum distance value for the bit $b_2=1$ stored at an eleventh register is input to a second input of the twenty-first comparator circuit, and (iii) a minimum of the first input and the second input of the twenty-first comparator circuit is determined by the twenty-first comparator circuit, output from an output of the twenty-first comparator circuit to an input of the eleventh register and stored by the eleventh register as the stored minimum distance value for the bit $b_2=1$, and (i) the minimum of the distance metrics $DS_e$, $DS_f$, $DS_g$ and $DS_h$ from the twentieth comparator circuit is input to a first input of an twenty-second comparator circuit, and (ii) a minimum distance value for the bit $b_3=1$ stored at a twelfth register is input to a second input of the twenty-second comparator circuit, and (iii) a minimum of the first input and the second input of the twenty-second comparator circuit is determined by the twenty-second comparator circuit, output from an output of the twenty-second comparator circuit to an input of the twelfth register and stored by the twelfth register as the stored minimum distance value for the bit $b_3=1$;

wherein the circuitry is configured to control performing a second stage of distance computations including:

for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations; and wherein the circuitry is configured to control, after the first and second stages of distance computations are performed, determining, for each bit b, a Log-Likelihood Ratio (LLR) by subtracting the minimum distance value for the bit b being equal to 1 from the minimum distance value for the bit b being equal to 0, and transmitting the LLR for the each bit b to a Forward Error Correction (FEC) decoder.

9. The apparatus of claim 8, wherein the first symbols are selected such that minimum distance values respectively corresponding to the K1 bits of a codeword for a given symbol corresponding to a given first constellation point of the first constellation can be generated without using each of stored minimum distance values respectively corresponding to the K1 bits of the codeword.

10. The apparatus of claim 8, wherein the first and second symbols are selected such that, after minimum distance computations are performed to generate minimum distance values corresponding to the K1 bits for all symbols represented in the first constellation remaining unprocessed after the first and second minimum distance computations are performed, the stored minimum distance value for each of the bits b being equal to zero and one is other than an original initialized value.

11. The apparatus of claim 10, wherein the minimum distances values are generated for a given selected set of four symbols of the remaining unprocessed symbols by performing the first or second minimum distance computations, according to whether representation of the four symbols of the given selected set in the first constellation corresponds to the representation of the first symbols or the second symbols in the first constellation.

12. The apparatus of claim 8, wherein, when K1 is greater than four, (i) the performing the first minimum distance computations for the first symbols $S_a$, $S_b$, $S_c$ and $S_d$ includes generating minimum distance values for each bit $b_{i=4\ to\ K1-1}$ equal to zero, in which a minimum of (a) the minimum of the distance metrics $DS_a$, $DS_b$, $DS_c$ and $DS_d$ and (b) a stored minimum distance value for the bit $b_i=0$, is determined and stored as the stored minimum distance value for the bit $b_i=0$; and (ii) the performing the second minimum distance computations for the second symbols $S_e$, $S_f$, $S_g$ and $S_h$ includes generating minimum distance values for each bit $b_{i=4\ to\ K1-1}$ equal to one, in which a minimum of (a) the minimum of the distance metrics $DS_e$, $DS_f$, $DS_g$ and $DS_h$ and (b) a stored minimum distance value for the bit $b_i=1$, is determined and stored as the stored minimum distance value for the bit $b_i=1$.

13. A wireless communication device comprising:

a receiver to receive a signal in a multiple input multiple output (MIMO) communication system; and a processing device and a memory including instructions which, when executed by the processing device, control decoding first and second signals received at a same antenna of the wireless communication device, wherein the first signal includes a symbol-1 to which K1 bits are mapped from a constellation point of a first modulation constellation formed by $M1=2^{K1}$ first constellation points representative respectively of M1 symbols-M/1 used by the MIMO system, wherein each first constellation point is associated with a codeword having K1 bits $b_0$, $b_1$, ..., $b_{K1-1}$, wherein the second signal includes a symbol-2 to which K2 bits are mapped from a constellation point of a second modulation constellation formed by $M2=2^{K2}$ second constellation points representative respectively of M2 symbols-M/2 used by the MIMO system, wherein each second constellation point is associated with a codeword having K2 bits $b_0$, $b_1$, ..., $b_{K2-1}$, and wherein the instructions, when executed by the processing device, control:

a first stage of distance computations, in which the first stage of distance computations includes:

(I) performing first minimum distance computations for first symbols $S_a$, $S_b$, $S_c$, and $S_d$ corresponding to respective first constellation points of the first constellation, wherein the first minimum distance computations include:

generating, using distance metrics $DS_a$, $DS_b$, $DS_c$ and $DS_d$ respectively of the first symbols $S_a$, $S_b$, $S_c$ and $S_d$ determined with respect to a transformation of the first received signal having a symbol representation according to the first constellation, minimum distance values respectively corresponding to the bits $b_0$, $b_1$, $b_2$ and $b_3$, in which:
(i) a minimum of the distance metrics $DS_a$ and $DS_b$ determined by a first comparator circuit is input to a first input of a second comparator circuit, (ii) a minimum distance value for the bit $b_0=0$ stored at a first register is input to a second input of the second comparator circuit, and (iii) a minimum of the first input and the second input of the second comparator circuit is determined by the second comparator circuit, output from an output of the second comparator circuit to an input of the first register and stored by the first register as the stored minimum distance value for the bit $b_0=0$, (i) a minimum of the distance metrics $DS_c$ and $DS_d$ determined by a third comparator circuit is input to a first input of a fourth comparator circuit, (ii) a minimum distance value for the bit $b_0=1$ stored at a second register is input to a second input of the fourth comparator circuit, and (iii) a minimum of the first input and the second input of the fourth comparator circuit is determined by the fourth comparator circuit, output from an output of the fourth comparator circuit to an input of the second register and stored by the second register as the stored minimum distance value for the bit $b_0=1$, (i) a minimum of the distance metrics $DS_a$ and $DS_d$ determined by a fifth comparator circuit is input to a first input of a sixth comparator circuit, (ii) a minimum distance value for the bit $b_1=0$ stored at a third register is input to a second input of the sixth comparator circuit, and (iii) a minimum of the first input and the second input of the sixth comparator circuit is determined by the sixth comparator circuit, output from an output of the sixth comparator circuit to an input of the third register and stored by the third register as the stored minimum distance value for the bit $b_1=0$, (i) a minimum of the distance metrics $DS_b$ and $DS_c$ determined by a seventh comparator circuit is input to a first input of a eighth comparator circuit, (ii) a minimum distance value for the bit $b_1=1$ stored at a fourth register is input to a second input of the eighth comparator circuit, and (iii) a minimum of the first input and the second input of the eighth comparator circuit is determined by the eighth comparator circuit, output from an output of the eighth comparator circuit to an input of the fourth register and stored by the fourth register as the stored minimum distance value for the bit $b_1=1$, (i) a minimum of the distance metrics $DS_a$, $DS_b$, $DS_c$ and $DS_d$ determined by a ninth comparator circuit is input to a first input of a tenth comparator circuit, (ii) a minimum distance value for the bit $b_2=0$ stored at a fifth register is input to a second input of the tenth comparator circuit, and (iii) a minimum of the first input and the second input of the tenth comparator circuit is determined by the tenth comparator circuit, output from an output of the tenth comparator circuit to an input of the fifth register and stored by the fifth register as the stored minimum distance value for the bit $b_2=0$, and (i) the minimum of the distance metrics $DS_a$, $DS_b$, $DS_c$ and $DS_d$ from the ninth comparator circuit is input to a first input of an eleventh comparator circuit, (ii) a minimum distance value for the bit $b_3=0$ stored at a sixth register is input to a second input of the eleventh comparator circuit, and (iii) a minimum of the first input and the second input of the eleventh comparator circuit is determined by the eleventh comparator circuit, output from an output of the eleventh comparator circuit to an input of the sixth register stored by the sixth register as the stored minimum distance value for the bit $b_3=0$;

(II) performing second minimum distance computations for second symbols $S_e$, $S_f$, $S_g$, and $S_h$ corresponding to respective first constellation points of the first constellation, wherein the second minimum distance computations include:

generating, using distance metrics $DS_e$, $DS_f$, $DS_g$ and $DS_h$ respectively of the second symbols $S_e$, $S_f$, $S_g$ and $S_h$ determined with respect to the transformation of the first received signal, the minimum distance values respectively corresponding to the bits $b_0$, $b_1$, $b_2$ and $b_3$, in which:
(i) a minimum of the distance metrics $DS_e$ and $DS_f$ determined by a twelfth comparator circuit is input to a first input of a thirteenth comparator circuit, (ii) the minimum distance value for the bit $b_0=0$ stored at a seventh register is input to a second input of the thirteenth comparator circuit, and (iii) a minimum of the first input and the second input of the thirteenth comparator circuit is determined by the thirteenth comparator circuit, output from an output of the thirteenth comparator circuit to an input of the seventh register and stored by the seventh register as the stored minimum distance value for the bit $b_0=0$, (i) a minimum of the distance metrics $DS_g$ and $DS_h$ determined by a fourteenth comparator circuit is input to a first input of a fifteenth comparator circuit, (ii) the minimum distance value for the bit $b_0=1$ stored at an eighth register is input to a second input of the fifteenth comparator circuit, and (iii) a minimum of the first input and the second input of the fifteenth comparator circuit is determined by the fifteenth comparator circuit, output from an output of the thirteenth circuit to an input of the eighth register and stored by the eighth register as the stored minimum distance value for the bit $b_0=1$, (i) a minimum of the distance metrics $DS_e$ and $DS_h$ determined by a sixteenth comparator circuit is input to a first input of a seventeenth comparator circuit, (ii) the minimum distance value for the bit $b_1=0$ stored at a ninth register is input to a second input of the seventeenth comparator circuit, and (iii) a minimum of the first input and the second input of the seventeenth comparator circuit is determined by the seventeenth comparator circuit, output from an output of the seventeenth comparator circuit to an input of the ninth register and stored by the ninth register as the stored minimum distance value for the bit $b_1=0$, (i) a minimum of the distance metrics $DS_f$ and $DS_g$ determined by an eighteenth comparator circuit is input to a first input of a nineteenth comparator circuit, (ii) the minimum distance value for the bit $b_1=1$ stored at a tenth register is input to a second input of the nineteenth comparator circuit, and (iii) a minimum of the first input and the second input of the nineteenth comparator circuit is determined by the nineteenth comparator circuit, output from an output of the nineteenth comparator circuit to an input of the tenth register and stored by the tenth register as the stored minimum distance value for the bit $b_1=1$, (i) a minimum of the distance metrics $DS_e$, $DS_f$, $DS_g$ and $DS_h$ determined by a twentieth comparator circuit is input to a first input of a twenty-first comparator circuit, (ii) a minimum distance value for the bit $b_2=1$ stored at an eleventh register is input to a second input of the twenty-first comparator circuit, and (iii) a minimum of the first input and the second input of the twenty-first comparator circuit is determined by the twenty-first comparator circuit, output from an output of the twenty-first comparator circuit to an input of the eleventh register and stored by the eleventh register as the stored minimum distance value for the bit $b_2=1$, and (i) the minimum of the distance metrics $DS_e$, $DS_f$, $DS_g$ and $DS_h$ from the twentieth comparator circuit is input to a first input of an twenty-second comparator circuit, (ii) a minimum distance value for the bit $b_3=1$ stored at a twelfth register is input to a second input of the twenty-second comparator circuit, and (iii) a minimum of the first input and the second input of the twenty-second comparator circuit is determined by the twenty-second comparator circuit, output from an output of the twenty-second comparator circuit to an input of the twelfth register and stored by the twelfth register as the stored minimum distance value for wherein the instructions, when executed by the processing device, control performing a second stage of distance computations including:

for each of L of the symbols-M/1, wherein L is less than M1, generating, using all of the symbols-M/2 represented in the second constellation, a minimum distance value respectively corresponding to the bits $b_0$, $b_1$, $b_2$ and $b_3$ with respect to a transformation of the second received signal having a symbol representation according to the second constellation, wherein the L symbols correspond to symbols represented in the first constellation having L lowest minimum distance metrics as determined from the first stage of distance computations, and when a minimum distance value corresponding to a given bit equal to one or zero for the L symbols is determined not to be available after the generating of the minimum distance values for each of the L symbols with all of the symbols-M/2, the minimum distance value corresponding to the given bit equal to one or zero determined in the first stage of distance computations is stored as the minimum distance value of the given bit equal to one or zero as determined by the second stage of distance computations; and wherein the instructions, when executed by the processing device, control, after the first and second stages of distance computations are performed, determining, for each bit b, a Log-Likelihood Ratio (LLR) by subtracting the minimum distance value for the bit b being equal to 1 from the minimum distance value for the bit b being equal to 0, and transmitting the LLR for the each bit b to a Forward Error Correction (FEC) decoder.

* * * * *